(12) United States Patent
Kleiner et al.

(10) Patent No.: US 9,074,050 B2
(45) Date of Patent: Jul. 7, 2015

(54) PROCESS FOR THE PRODUCTION OF POLYMERS BY USING COUPLING REACTIONS

(75) Inventors: Matthias Kleiner, Mannheim (DE); Martin Elbs, Basel (CH); Marcel Kastler, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/122,873

(22) PCT Filed: May 29, 2012

(86) PCT No.: PCT/IB2012/052663
§ 371 (c)(1),
(2), (4) Date: Nov. 27, 2013

(87) PCT Pub. No.: WO2012/164479
PCT Pub. Date: Dec. 6, 2012

(65) Prior Publication Data
US 2014/0080994 A1    Mar. 20, 2014

Related U.S. Application Data

(60) Provisional application No. 61/491,240, filed on May 30, 2011.

(51) Int. Cl.
*C08F 28/06* (2006.01)
*C08G 73/00* (2006.01)
(Continued)

(52) U.S. Cl.
CPC ............. *C08G 75/06* (2013.01); *C08G 61/124* (2013.01); *C08G 61/126* (2013.01);
(Continued)

(58) Field of Classification Search
CPC .. B01J 19/082; B01J 19/1818; B01J 19/1831; B01J 19/1956; B01J 19/1862; B01J 19/242; B01J 19/243; B01J 19/2445; B01J 19/245; B01J 19/285; B01J 19/123; B01J 2219/00202; C08G 75/06; C08G 61/124; C08G 61/126; C08G 2261/124; C08G 2261/3223; C08G 2261/344; C08G 2261/411
USPC .......................................... 528/368; 526/257
See application file for complete search history.

(56) References Cited

U.S. PATENT DOCUMENTS

| 6,451,459 B1 | 9/2002 | Tieke et al. |
| 2009/0302311 A1 | 12/2009 | Turbiez et al. |

FOREIGN PATENT DOCUMENTS

| EP | 1 754 736 A1 | 2/2007 |
| EP | 1 830 951 | 9/2007 |

(Continued)

OTHER PUBLICATIONS

Norio Miyaura et al., "Palladium-Catalyzed Cross-Coupling Reactions of Organoboron Compounds", Chemical Reviews, vol. 95, 1995, pp. 2457-2483.

(Continued)

*Primary Examiner* — William Cheung
(74) *Attorney, Agent, or Firm* — Oblon, McClelland, Maier & Neustadt, L.L.P.

(57) ABSTRACT

The present invention relates to a continuous process for the production of polymeric coupling products by using a reactor assembly which is equipped with two or more reaction cells. The educt fluid is pumped through the reaction cells and thoroughly mixed therein by means of agitators. Preferably the process according to the invention is used for the preparation of coupling products which show at least partially precipitation and/or gelation effects during the performance of the synthesis. The precipitation and/or gelation effects are associated with and increase of the viscosity of the reaction system under reaction conditions. The products which are obtained by the process according to the invention have increased molecular weight and low polydispersity over similar products which were obtained in batch experiments.

19 Claims, 2 Drawing Sheets

(51) Int. Cl.
  *C08G 75/06* (2006.01)
  *C08G 61/12* (2006.01)
  *B01J 19/08* (2006.01)
  *B01J 19/12* (2006.01)
  *B01J 19/18* (2006.01)
  *B01J 19/24* (2006.01)
  *B01J 19/28* (2006.01)

(52) U.S. Cl.
  CPC . *C08G 2261/124* (2013.01); *C08G 2261/3223* (2013.01); *C08G 2261/344* (2013.01); *C08G 2261/411* (2013.01); *B01J 19/082* (2013.01); *B01J 19/123* (2013.01); *B01J 19/1818* (2013.01); *B01J 19/1831* (2013.01); *B01J 19/1856* (2013.01); *B01J 19/1862* (2013.01); *B01J 19/242* (2013.01); *B01J 19/243* (2013.01); *B01J 19/2445* (2013.01); *B01J 19/245* (2013.01); *B01J 19/285* (2013.01); *B01J 2219/00202* (2013.01)

(56) References Cited

FOREIGN PATENT DOCUMENTS

| WO | WO 2004/101581 | A2 | | 11/2004 |
|---|---|---|---|---|
| WO | WO 2005/049695 | A1 | | 6/2005 |
| WO | WO 2006/069773 | A1 | | 7/2006 |
| WO | WO 2008/000664 | A1 | | 1/2008 |
| WO | WO 2008/068019 | A1 | * | 6/2008 |
| WO | WO 2009/047104 | A | | 4/2009 |
| WO | WO2010/049321 | A1 | * | 5/2010 |
| WO | WO 2010/049321 | A1 | | 5/2010 |
| WO | WO 2010/049323 | A1 | | 5/2010 |
| WO | WO 2010/108873 | A1 | | 9/2010 |
| WO | WO 2010/115767 | A1 | | 10/2010 |
| WO | WO 2010/136352 | A1 | | 12/2010 |

OTHER PUBLICATIONS

Nicholas E. Leadbeater et al., "Transition-Metal-Free Suzuki-Type Coupling Reactions", Angew. Chem. Int. Ed. Eng., vol. 42, No. 12, 2003, pp. 1407-1409.

Thomas I. Wallow et al., "Highly Efficient and Accelerated Suzuki Aryl Couplings Mediated by Phosphine-Free Palladium Sources", J. Org. Chem. , vol. 59, 1994, pp. 5034-5037.

Marcus Remmers et al., "Synthesis, Optical Absorption and Fluorescence of New Poly(p-phenylene)-related Polymers", Macromol. Rapid Commun., vol. 17, 1996, pp. 239-252.

Francesco Babudri et al., "Synthesis of Conjugated Oligomers and Polymers: the Organometallic Way", J. Mater. Chem., vol. 14, 2004, pp. 11-34.

John K. Stille, "The Palladium-Catalyzed Cross-Coupling Reactions of Organotin Reagents with Organic Electrophiles", Angew. Chem. Int. Ed. Engl., vol. 25, 1986, pp. 508-524.

Ei-ichi Negishi et al., A Regiospecific Synthesis of Carbosubstituted Heteroaromatic Derivatives via Pd-Catalyzed Cross Coupling[1, †], Heterocycles, vol. 18, 1982, pp. 117-122.

Yasuo Hatanaka et al., "Highly Selective Cross-Coupling Reactions of Organosilicon Compounds Mediated by Fluoride Ion and a Palladium Catalyst", Synlett, 1991, pp. 845-853.

International Search Report issued Sep. 20, 2012 in PCT/IB2012/052663.

* cited by examiner

PROCESS FOR THE PRODUCTION OF POLYMERS BY USING COUPLING REACTIONS

This application is a national stage application under 35 U.S.C. Section 371 of PCT Application Number PCT/IB12/52663 filed May 29, 2012, which claims benefit of U.S. provisional application No. 61/491,240 filed May 30, 2011. The entire disclosures of which are hereby incorporated by reference.

The invention relates to a continuous process for the production of polymers by using coupling reactions whereby at least one educt fluid stream is delivered to an assembly of agitated reaction cells, the monomers or oligomers which are dissolved in the educt fluid are brought to reaction, and the product mixture is discharged out of the exit line of the reactor assembly. The process of the present invention is suited for the production of coupling products which have a high molecular weight and a low degree of polydispersity. Such materials are of great relevance in the field of opto-electronics and printed electronics whereby the performance of the materials is crucially determined by the quality of the material properties.

Continuous processes for the performance of coupling reactions already have been described in the state of the art previously. Particularly good results have been reached by using tubular reactors which are equipped with static mixers. Reactor tubes with a compressed bed of inert particles have been described as a substitute for reactor tubes with static mixers. By using these kinds of tubular reactors with static mixing elements it is possible to synthesis materials which exhibit well defined target properties. The term target properties relates to a high molecular weight and a low degree of polydispersity.

The continuous reaction process in connection with static mixing elements is constricted in case that the polymeric reaction products show precipitation effects. The precipitation of reaction product and/or a high increase in the viscosity in the reaction system leads to a blockage of the static mixers or the bed of compressed particles in the reactor which leads to pressure increase and a distortion or interruption of the supply with educt fluid.

The EP 1 830 951 discloses the use of a microreactor or tubular reactor for the continuous production of polymers whereby the polymers are formed by coupling reactions and polymer products show improved properties vis-a-vis the polymeric coupling products which have been prepared in a stirred batch reactor. The synthesis of highly viscous polymer solutions is limited because a precipitation and blockage of channels can occur which results in a distortion of the synthesis and impairs the properties of the products which are formed.

Due to these technical difficulties the performance of the reaction in a continuous process is not possible in those cases where the reaction systems show precipitation of the reaction product and/or high viscosity increase in the reaction system. Therefore these types of reaction systems are processed discontinuously in a batch reactor.

The disadvantage is that the quality of the products do not always fulfil the target specifications and therefore require a cost intensive purification.

One of the technical problems to be solved is to provide a process for the preparation of polymeric coupling products. Another problem is to improve the product quality of polymeric coupling products with respect to increase in molecular weight and low degree of polydispersity. Particularly the process shall be useful for the reaction systems which are difficult to handle. One of the problems relates to an improvement of the synthesis method for polymeric coupling products in such a way that the work for purification of products is low whereby the polymer coupling reactions shall be conducted in a manner with low energy consumption.

The problems above as well as many other problems are solved by providing a process for the continuous preparation of polymeric coupling products in an agitated reactor assembly comprising at least two cells with means for agitation and including the following steps:

(i) At least one educt fluid which contains monomer species which are in contact with a solvent is contacted with a catalyst and/or suspended catalyst in a mixing area whereby the step of contacting can either be performed in the entrance area of an agitated reactor assembly or prior to delivering the educt fluid to the agitated reactor assembly;

(ii) conveying the mixture of educt fluid and catalyst solution through the cells of the agitated reactor assembly to generate the polymeric coupling product whereby the means of causing agitation within the cells do not require a mechanical connection of the agitating mechanism within the cell to the drive mechanism which is outside the cell;

(iii) discharging the polymeric coupling product out of the exit line of the agitated reactor cell assembly.

The polymeric coupling reactions according to the present invention are reactions which form polymers by means of C—C or C—N coupling reactions catalysed by transition metals. For the purpose of the present invention, a C—C or C—N coupling reaction catalysed by transition metals is a coupling of two organic compounds to form a new C—C or C—N bond in the presence of a transition metal or a transition metal compound as catalyst, optionally with addition of at least one base and/or at least one further additive, with a reactive group being eliminated from each of the two organic compounds. The transition metal or transition metal compound is preferably selected from among palladium or palladium compounds, cobalt or cobalt compounds or iron or iron compounds. Particular preference is given to palladium or palladium compounds or nickel or nickel compounds. For formation of polymers, it is necessary for each monomer to bear at least two reactive groups which can be reacted with one another or with the reactive groups of another monomer in the coupling reaction.

For the purpose of the present invention, a reactive group is any group whose bond to a carbon atom or a nitrogen atom of the monomer is broken during the course of the coupling reaction and which then leaves the monomer. This can also be a single atom, e.g. a halogen or a hydrogen atom.

As monomers which have at least two reactive groups, all organic compounds which have at least two reactive groups and are known to those skilled in the art as monomers in such coupling reactions can be used in the process of the invention. Here, the groups described in more detail below and X and Y are possible as reactive groups.

The polycondensation reaction preferably proceeds according to the reaction shown in Scheme 1 or Scheme 2:

(Scheme 1)

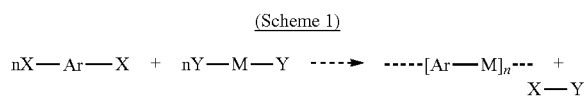

(Scheme 2)

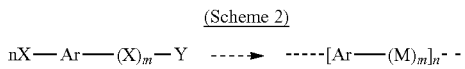

where the symbols and indices used have the following meanings:

X is identical or different on each occurrence and is in each case chlorine, bromine, iodine, fluoroalkylsulphonate or perfluoroalkylsulphonate, e.g. trifluormethanesulphonate or nonafluorobutanesulphonate;

Y is identical or different on each occurrence and is in each case X or $B(OH)_2$, $B(OR)_2$, $BR_2$, $SnR_3$, NR—H, $NH_2$, MgCl, MgBr, MgI, $SiR_2F$, $SiRF_2$, ZnCl, ZnBr, ZnI or H if it is bound directly to a vinylic or acetylenic bond of M;

Ar is identical or different on each occurrence and is in each case a divalent aromatic or heteroaromatic ring system which has from 5 to 60 aromatic ring atoms and may also be substituted by one or more radicals F, Cl, Br, I, R or OR;

M is identical or different on each occurrence and is in each case a group Ar or an organic having form 1 to 60 carbon atoms, preferably a group Ar, which is substituted by one or more, preferably two or more, vinyl or acetylene groups;

R is identical or different on each occurrence and is in each case H, a linear alkyl chain having from 1 to 40 carbon atoms or branched or cyclic alkyl chain having from 3 to 40 carbon atoms, in which one or more nonadjacent carbon atoms may also be replaced by N—$R^1$, —O—, —S—, —O—CO—O—, —CO—O—, —$CR^1$=$CR^1$—, —C≡C— and in which one or more H atoms may also be replaced by F, Cl, Br, I or CN, or an aromatic or heteroaromatic ring system which has from 5 to 60 aromatic ring atoms and which may also be substituted by one or more nonaromatic radicals R; with two or more of the radicals R together also being able to form a ring system;

$R^1$ is identical or different on each occurrence and is in each case H or an aliphatic or aromatic hydrocarbon radical having from 1 to 20 carbon atoms;

n is on each occurrence a number of up to 10 000;

m is on each occurrence either 0 or 1;

with the broken-line bond indicating the linkage in the polymer chain.

The coupling reaction catalysed by transition metals is preferably from the group consisting of Suzuki couplings, Yamamoto couplings, Hartwig-Buchwald couplings, Stille couplings, Heck couplings, Sonogashira couplings, Negishi couplings, Hiyama couplings and Grigndard cross-couplings (Kumada couplings). A general overview of these coupling reactions and the reaction conditions usually employed for them may be found in Cross Coppling Reactions (Topics in Current Chemistry, Ed. N. Miyaura, 219, Springer-Verlag 2002) and in Metal-catalysed Cross-coupling Reactions (Ed. F. Diederich, P. J. Stang, Wiley-VCH,1998).

In a preferred embodiment of the process according to the invention the product fluid flowing out of the reactor is subject to an analytical characterization within specified time intervals. Preferably the process of the invention concerns reaction systems where the formed polymeric coupling products start to precipitate at least partially during the performance of the reaction and/or the viscosity of the product fluid increases. Preferably, the polymer containing product fluids which are obtained according to the process of the invention have a viscosity which is in the range from 0.01 Pa*s to 50 Pa*s, more preferably in the range from 0.1 to 25 Pa*s and even more preferably in the range from 0.2 Pa*s to 10 Pa*s. Such viscosity values relate to a temperature of 25° C. The shear-rates which are in connected to the above given viscosity ranges are in the range from 0.3 $s^{-1}$ to 50 $s^{-1}$.

In certain embodiments according to the process of the invention the product fluids may show non-newtonian behaviour at 25° C. and it is within the spirit of the invention that the product fluid is characterized by thixotropic behaviour.

Besides the precipitation of reaction product it is also possible that the viscosity increase is caused by gel formation within the reaction system. Precipitation as well as gel formation can cause an increase in the viscosity of the reaction system.

In a preferred embodiment the process of the invention is performed by an automatic process control.

In general the reactor is charged with educt fluids by using pumps and the pressure inside the reactor assembly during the process is in the range from ambient pressure to 200 bar.

In another preferred embodiment the inner part of the reaction cells of the agitated reactor assembly are exposed to radiation energy while the reaction is performed or the reaction is initiated by irradiation. The source of radiation energy may be given by UV or γ-radiation.

In a preferred embodiment the entrance of the reactor assembly is in connection with a feed gas line for inert gas. Preferably the reactor assembly and/or tubes are flushed with inert gas in order to remove oxygen or moisture in case that reaction systems are air sensitive or moisture sensitive. For example nitrogen or argon may be used as an inert gas whereby the use of argon is preferred.

In a preferred embodiment the reaction system is characterized in that, that the polymeric coupling products which are formed within the process exhibit a low solubility and/or high viscosity. The high viscosity can be caused by the precipitation of reaction product and/or by the formation of gel-like agglomerates in the reaction system.

The process according to the invention concern the preparation of conjugated and/or partially conjugated polymers which are of increasing technical relevance in the fields of light emitting diodes, organic transistors, organic circuits and photo dyes for organic solar cells.

A more detailed description of the monomers:

The monomers which are contained in the educt fluid are preferably selected from the group of (hetero)aromatic compounds with functional halide and boron groups which are attached to a thiophene, furane, pyrrole, or phenyl ring, especially thiophene, or furane ring, very especially a thiophene ring.

Examples of (hetero)aromatic compounds are compounds derived from a diketopyrrolopyrrole skeleton. Such compounds as well as polymers derived therefrom are, for example, described in U.S. Pat. No. 6,451,459B1, WO05/049695, WO08/000664, WO09/047104, PCT/EP2009/063767, PCT/EP2009/063769, PCT/EP2010/053655, PCT/EP2010/054152 and PCT/EP2010/056776, and can be represented by formula

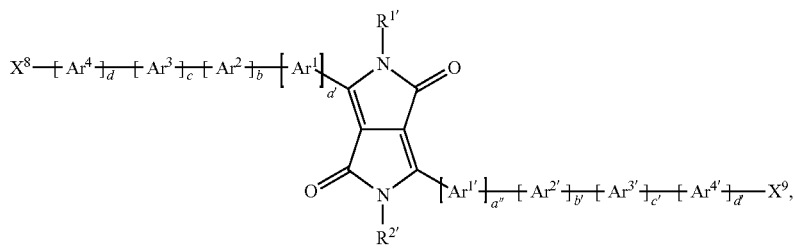

wherein a' is 1, 2, or 3; a" is 0, 1, 2, or 3; b is 0, 1, 2, or 3; b' is 0, 1, 2, or 3; c is 0, 1, 2, or 3; c' is 0, 1, 2, or 3; d is 0, 1, 2, or 3; d' is 0, 1, 2, or 3; with the proviso that b' is not 0, if a" is 0;

$R^{1'}$ and $R^{2'}$ may be the same or different and are selected from hydrogen, a $C_1$-$C_{100}$alkyl group, —COOR$^{106}$, a $C_1$-$C_{100}$alkyl group which is substituted by one or more halogen atoms, hydroxyl groups, nitro groups, —CN, or $C_6$-$C_{18}$aryl groups and/or interrupted by —O—, —COO—, —OCO—, or —S—; a $C_7$-$C_{100}$arylalkyl group, a carbamoyl group, $C_5$-$C_{12}$cycloalkyl, which can be substituted one to three times with $C_1$-$C_8$alkyl and/or $C_1$-$C_8$alkoxy, a $C_6$-$C_{24}$aryl group, in particular phenyl or 1- or 2-naphthyl which can be substituted one to three times with $C_1$-$C_8$alkyl, $C_1$-$C_{24}$thioalkoxy, and/or $C_1$-$C_{24}$alkoxy, or pentafluorophenyl, $R^{106}$ is $C_1$-$C_5$alkyl, especially $C_4$-$C_{25}$alkyl;

$Ar^1$, $Ar^{1'}$, $Ar^2$, $Ar^{2'}$, $Ar^3$, $Ar^{3'}$, $Ar^4$ and $Ar^{4'}$ are independently of each other heteroaromatic, or aromatic rings, which optionally can be condensed and/or substituted, especially

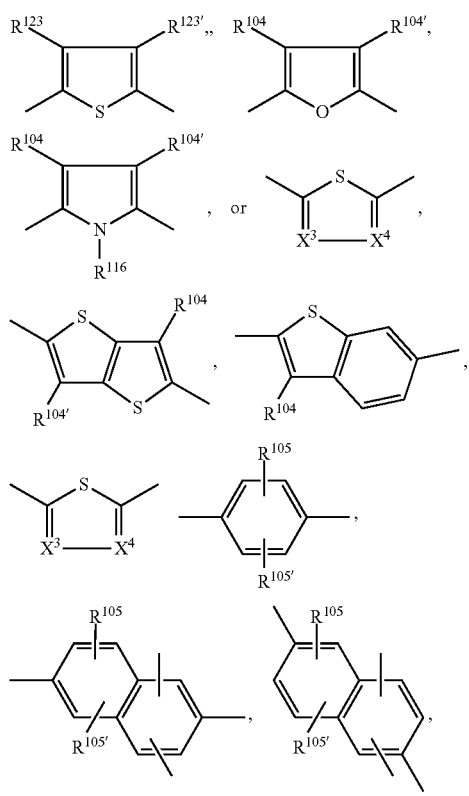

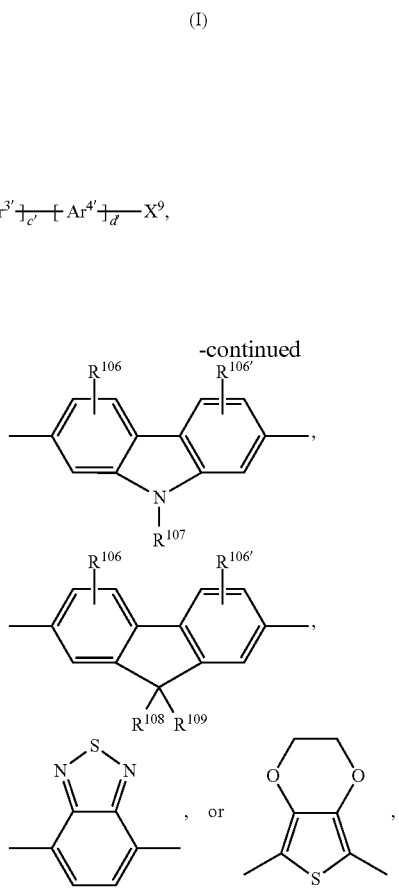

wherein
one of $X^3$ and $X^4$ is N and the other is $CR^{99}$,
$R^{99}$, $R^{104}$, $R^{104'}$, $R^{123}$ and $R^{123'}$ are independently of each other hydrogen, halogen, especially F, or a $C_1$-$C_{25}$alkyl group, especially a $C_4$-$C_{25}$alkyl, which may optionally be interrupted by one or more oxygen or sulphur atoms, $C_7$-$C_{25}$arylalkyl, or a $C_1$-$C_{25}$alkoxy group,
$R^{105}$, $R^{105'}$, $R^{106}$ and $R^{106'}$ are independently of each other hydrogen, halogen, $C_1$-$C_{25}$alkyl, which may optionally be interrupted by one or more oxygen or sulphur atoms; $C_7$-$C_{25}$arylalkyl, or $C_1$-$C_{18}$alkoxy,
$R^{107}$ is $C_7$-$C_{25}$arylalkyl, $C_6$-$C_{18}$aryl; $C_6$-$C_{18}$aryl which is substituted by $C_1$-$C_{18}$alkyl, $C_1$-$C_{18}$perfluoroalkyl, or $C_1$-$C_{18}$alkoxy; $C_1$-$C_{18}$alkyl; $C_1$-$C_{18}$alkyl which is interrupted by —O—, or —S—;
or —COOR$^{124}$;
$R^{124}$ is $C_1$-$C_{25}$alkyl group, especially a $C_4$-$C_{25}$alkyl, which may optionally be interrupted by one or more oxygen or sulphur atoms, $C_7$-$C_{25}$arylalkyl,
$R^{108}$ and $R^{109}$ are independently of each other H, $C_1$-$C_{25}$alkyl, $C_1$-$C_{25}$alkyl which is substituted by E and/or interrupted by D, $C_7$-$C_{25}$arylalkyl, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, or $C_7$-$C_{25}$aralkyl, or $R^{108}$ and $R^{109}$ together form a group of formula =$CR^{110}R^{111}$, wherein
$R^{110}$ and $R^{111}$ are independently of each other H, $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, or $C_2$-$C_{20}$heteroaryl, or $C_2$-$C_{20}$heteroaryl which is substituted by G, or $R^{108}$ and $R^{109}$ together form a five or six membered ring, which optionally can be substituted by $C_1$-$C_{18}$alkyl, $C_1$-$C_{18}$alkyl which is substituted by E and/or interrupted by D, $C_6$-$C_{24}$aryl, $C_6$-$C_{24}$aryl which is substituted by G, $C_2$-$C_{20}$heteroaryl, $C_2$-$C_{20}$heteroaryl which is substituted by G, $C_2$-$C_{18}$alkenyl, $C_2$-$C_{18}$alkynyl, $C_1$-$C_{18}$alkoxy, $C_1$-$C_{18}$alkoxy which is substituted by E and/or interrupted by D, or $C_7$-$C_{25}$aralkyl, D is —CO—, —COO—, —S—, —O—, or —NR$^{112}$—, E is $C_1$-$C_8$thioalkoxy, $C_1$-$C_8$alkoxy, CN, —NR$^{112}$R$^{113}$, —CONR$^{112}$R$^{113}$, or halogen, G is E, or $C_1$-$C_{18}$alkyl, and $R^{112}$ and $R^{113}$ are independently of each other H; $C_6$-$C_{18}$aryl; $C_6$-$C_{18}$aryl which is substituted by $C_1$-$C_{16}$alkyl, or $C_1$-$C_{18}$alkoxy; $C_1$-$C_{18}$alkyl; or $C_1$-$C_{18}$alkyl which is interrupted by —O—, and $X^8$ and $X^9$ are independently of each other a halogen atom, very especially I, or Br; or —OS(O)$_2$CF$_3$, —OS(O)$_2$-aryl, especially

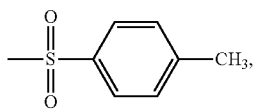

—OS(O)$_2$CH$_3$, —B(OH)$_2$, —B(OH)$_3$⁻, —B(F)$_3$⁻, —B(OY$^1$)$_2$,

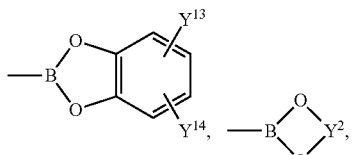

—BF$_4$Na, or —BF$_4$K, wherein Y$^1$ is independently in each occurrence a $C_1$-$C_{10}$alkyl group and Y$^2$ is independently in each occurrence a $C_2$-$C_{10}$alkylene group, such as —CY$^3$Y$^4$—CY$^5$Y$^6$—, or —CY$^7$Y$^8$—CY$^9$Y$^{10}$—CY$^{11}$Y$^{12}$—, wherein Y$^3$, Y$^4$, Y$^5$, Y$^6$, Y$^7$, Y$^8$, Y$^9$, Y$^{10}$, Y$^{11}$ and Y$^{12}$ are independently of each other hydrogen, or a $C_1$-$C_{10}$alkyl group, especially —C(CH$_3$)$_2$C(CH$_3$)$_2$—, —C(CH$_3$)$_2$CH$_2$C(CH$_3$)$_2$—, or —CH$_2$C(CH$_3$)$_2$CH$_2$—, and Y$^{13}$ and Y$^{14}$ are independently of each other hydrogen, or a $C_1$-$C_{10}$alkyl group.

Ar$^1$, Ar$^{1'}$, Ar$^2$, Ar$^{2'}$, Ar$^3$, Ar$^{3'}$, Ar$^4$ and Ar$^{4'}$ are preferably

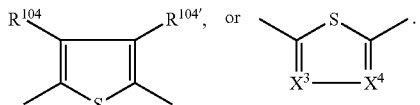

$R^{1'}$ and $R^{2'}$ can be different, but are preferably the same. Preferably, $R^{1'}$ and $R^{2'}$ independently from each other stand for $C_1$-$C_{100}$alkyl, $C_5$-$C_{12}$cycloalkyl, which can be substituted one to three times with $C_1$-$C_8$alkyl and/or $C_1$-$C_8$alkoxy, phenyl or 1- or 2-naphthyl which can be substituted one to three times with $C_1$-$C_8$alkyl and/or $C_1$-$C_8$alkoxy, or —CR$^{201}$R$^{202}$—(CH$_2$)$_m$-A$^3$, wherein $R^{201}$ and $R^{202}$ stand for hydrogen, or $C_1$-$C_4$alkyl, A$^3$ stands for phenyl or 1- or 2-naphthyl, which can be substituted one to three times with $C_1$-$C_8$alkyl and/or $C_1$-$C_8$alkoxy, and m stands for 0 or 1.

$R^{1'}$ and $R^{2'}$ are more preferably a $C_1$-$C_{36}$ alkyl group, especially a $C_{12}$-$C_{24}$alkyl group, such as n-dodecyl, tridecyl, tetradecyl, pentadecyl, hexadecyl, 2-ethyl-hexyl, 2-butyl-hexyl, 2-butyl-octyl, 2-hexyldecyl, 2-decyl-tetradecyl, heptadecyl, octadecyl, eicosyl, heneicosyl, docosyl, or tetracosyl. In a particularly preferred embodiment of the present invention $R^{1'}$ and $R^{2'}$ are a 2-hexyldecyl, or 2-decyl-tetradecyl group.

Advantageously, the groups $R^{1'}$ and $R^{2'}$ can be represented by formula

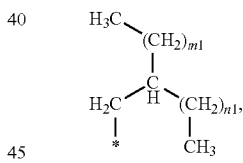

wherein m1=n1+2 and m1+n1≤24. Chiral side chains, such as $R^{1'}$ and $R^{2'}$, can either be homochiral, or racemic, which can influence the morphology of the polymers.

In said embodiment preferred "AA- and BB-type compounds" are compounds of formula Ia to Iy and IIa to IIy, respectively:

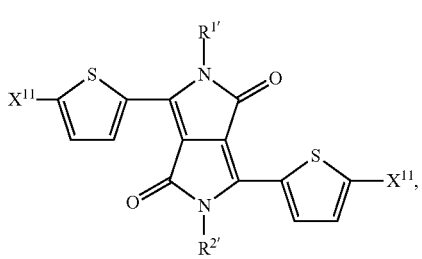

(Ia)

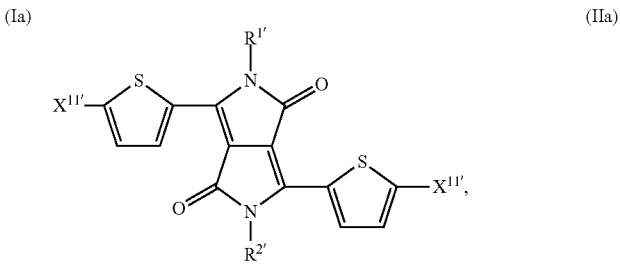

(IIa)

-continued
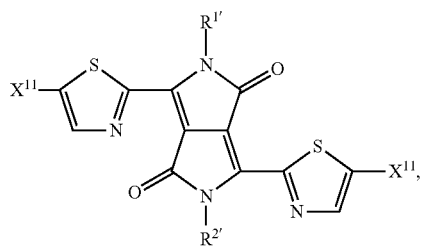
(Ib)
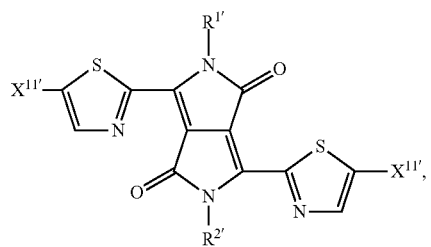
(IIb)
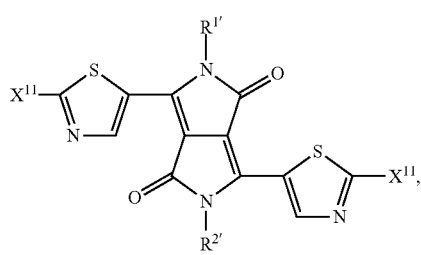
(Ic)
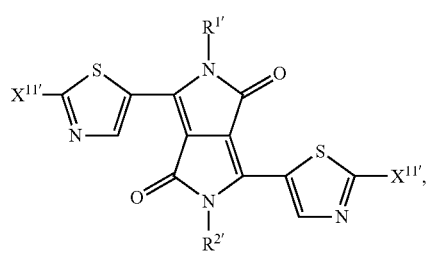
(IIc)
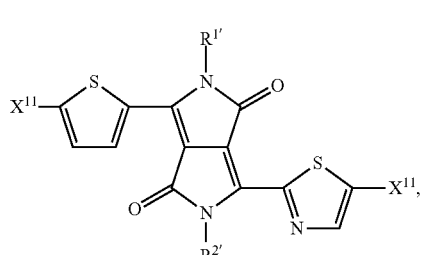
(Id)
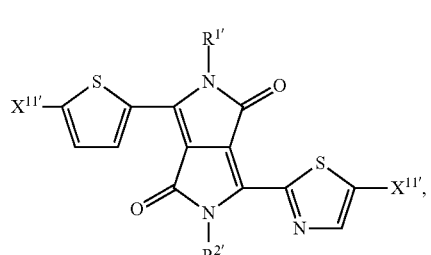
(IId)
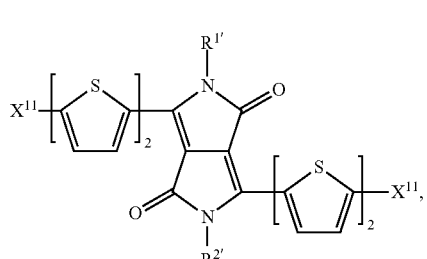
(Ie)
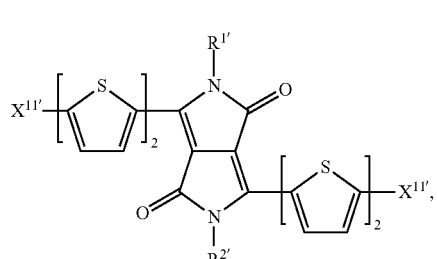
(IIe)
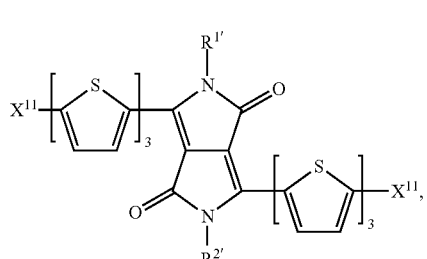
(If)
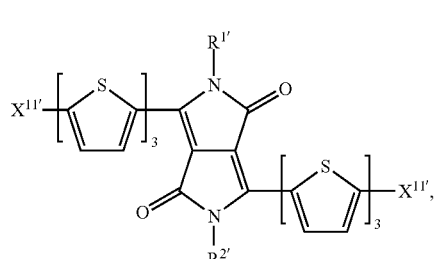
(IIf)
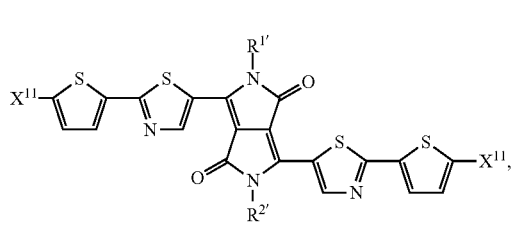
(Ig)
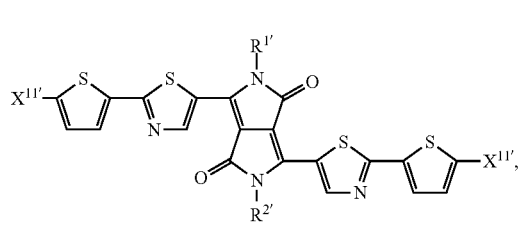
(IIg)

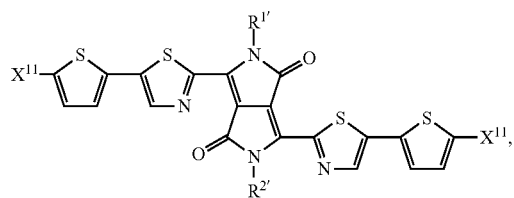
(Ih)
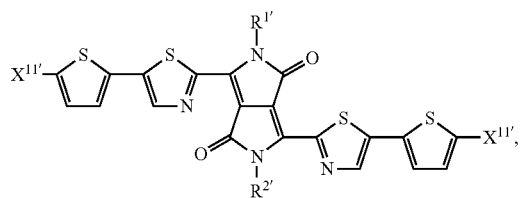
(IIh)
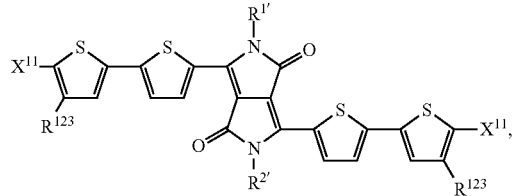
(Ii)
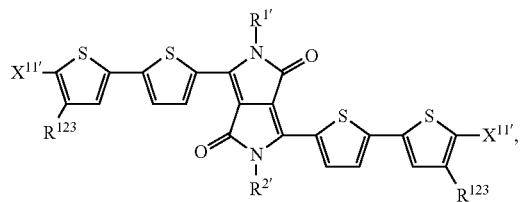
(IIi)
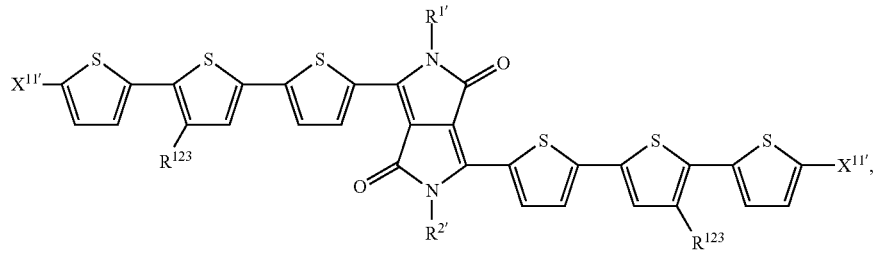
(Ij)
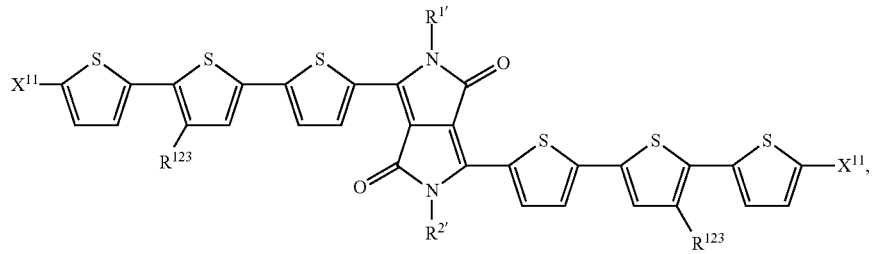
(IIj)
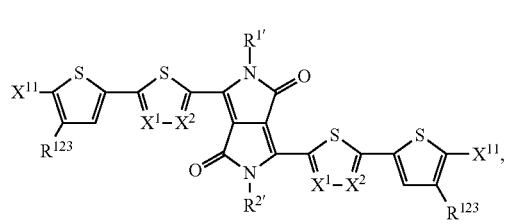
(Ik)
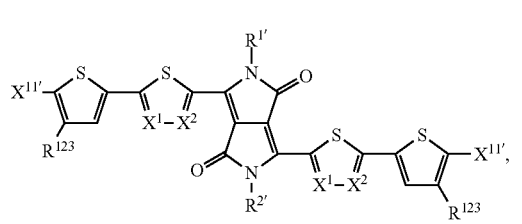
(IIk)
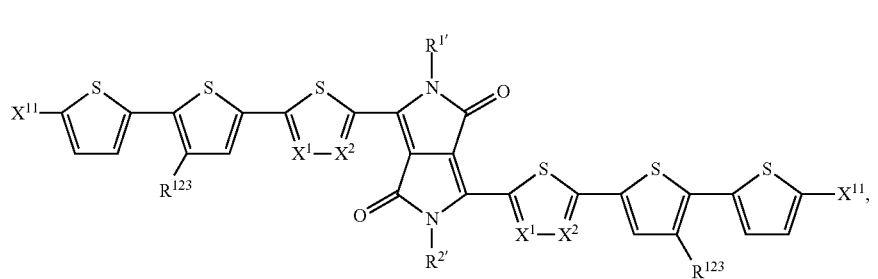
(Il)

-continued
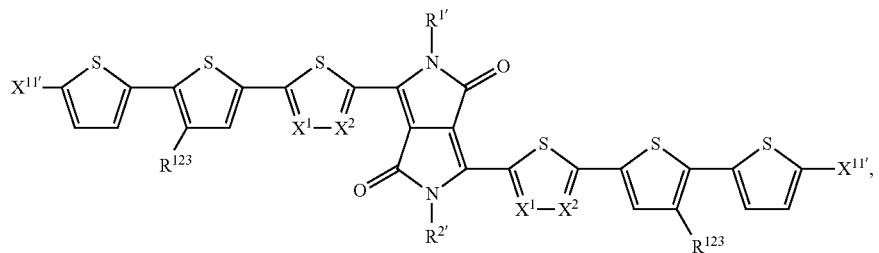
(III)
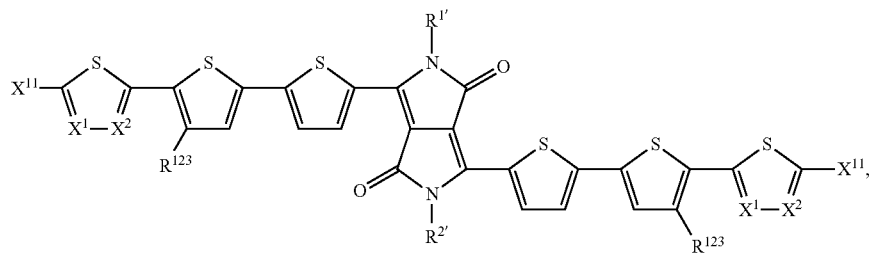
(Im)
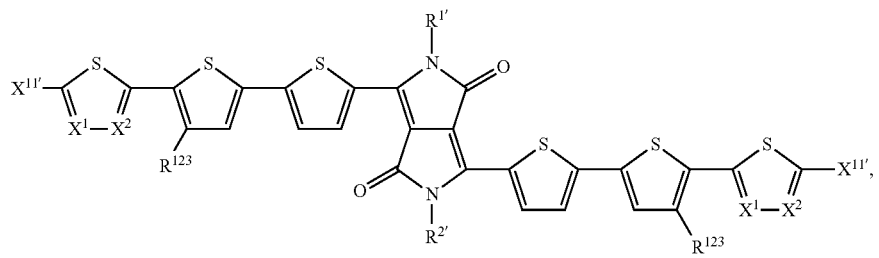
(IIm)
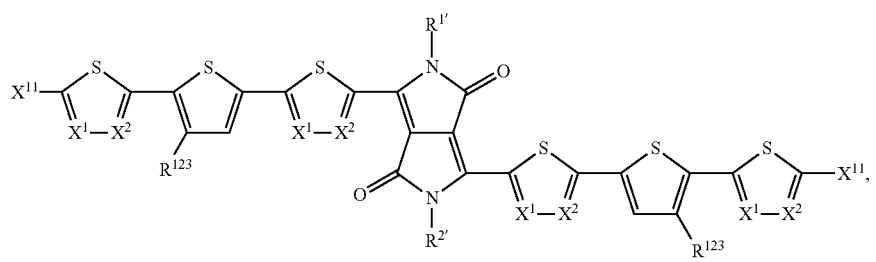
(In)
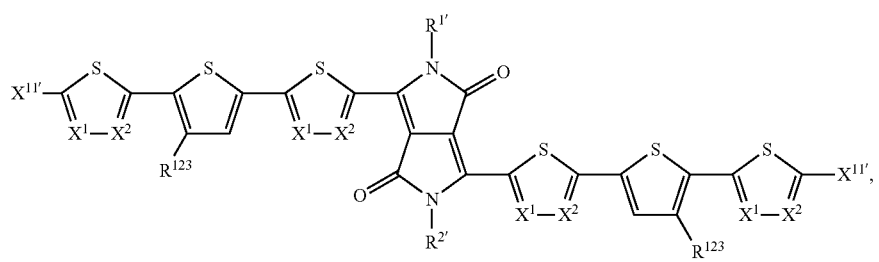
(IIn)
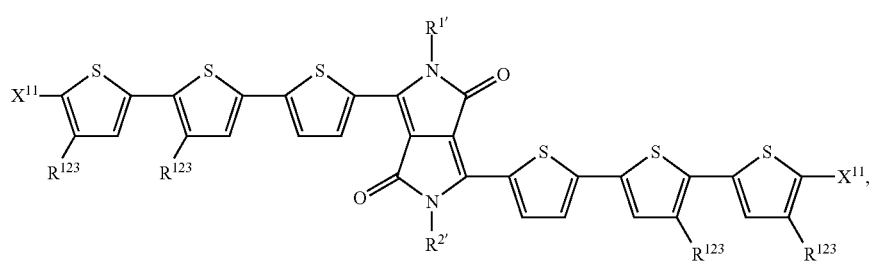
(Io)

-continued
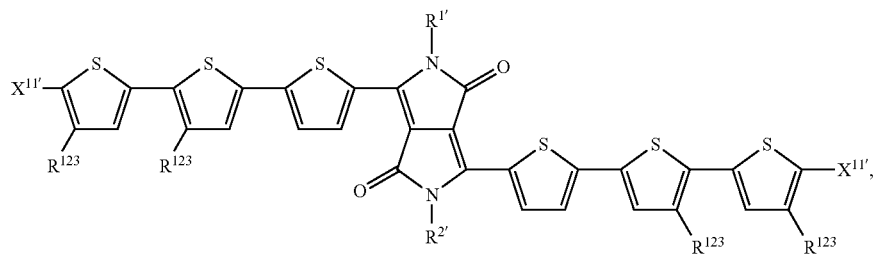
(IIo)
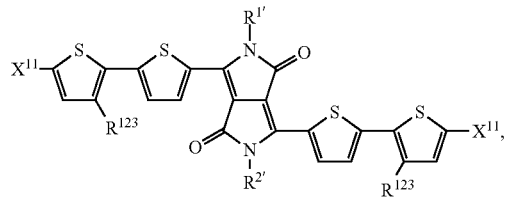
(Ip) (IIp)
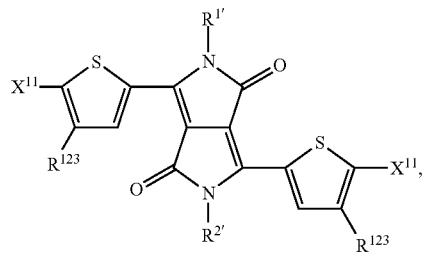
(Iq) (IIq)
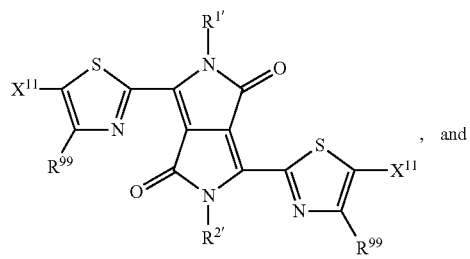
(Ir) (IIr)
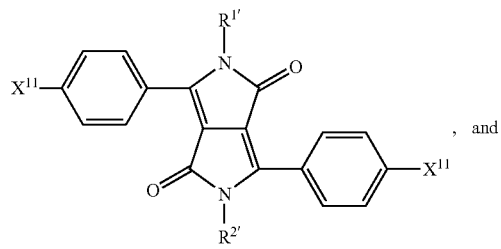
(Is) , and (IIs)
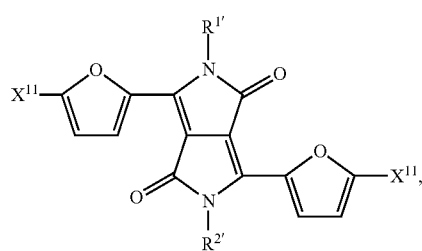
(It) (IIt)

-continued
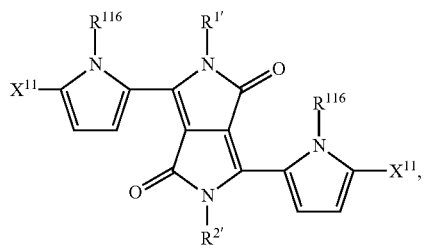
(Iu)
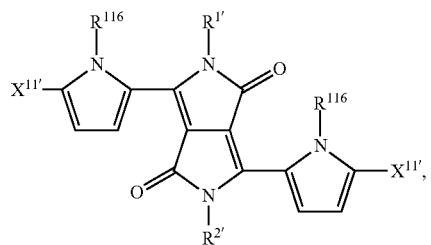
(IIu)
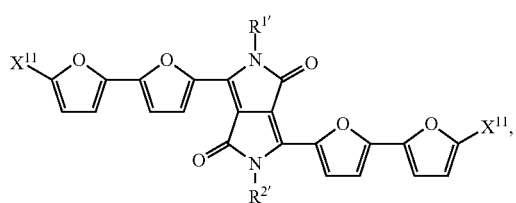
(Iv)
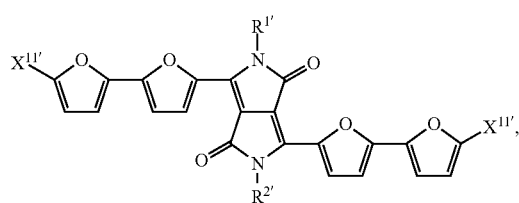
(IIv)
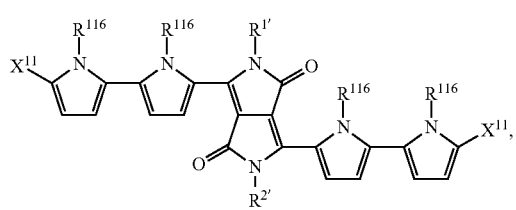
(Iw)
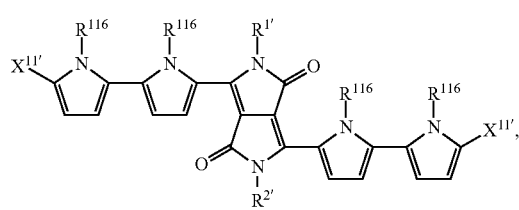
(IIw)
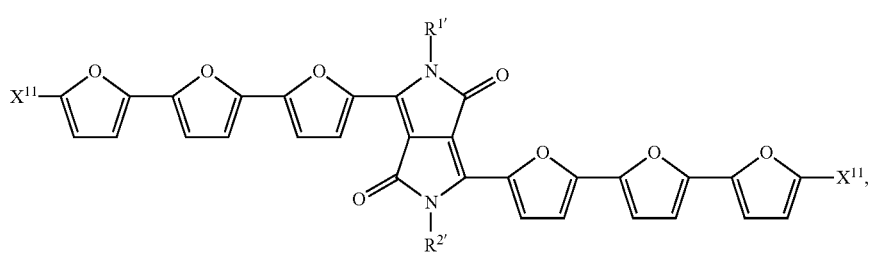
(Ix)
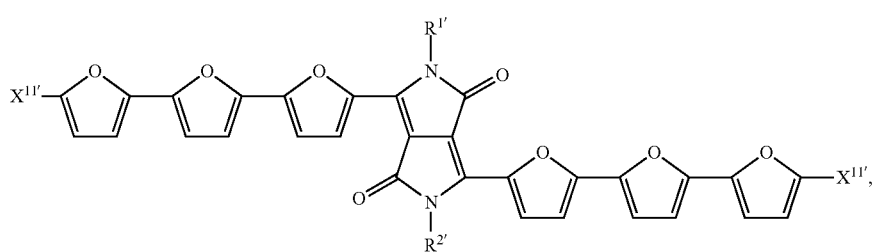
(IIx)
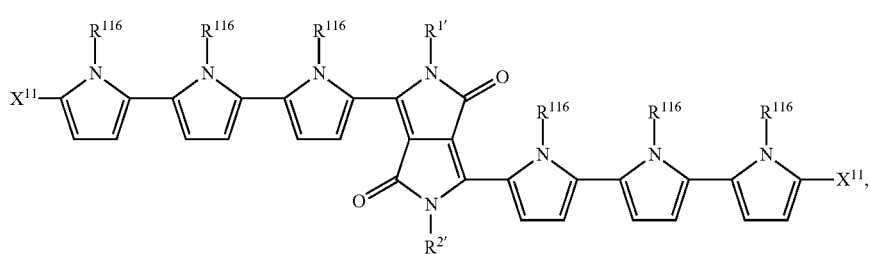
(Iy)

-continued

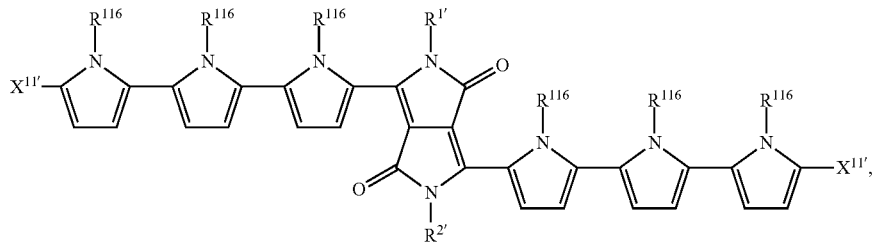

(IIy)

$R^{1'}$ and $R^{2'}$ may be the same or different and are selected from hydrogen, a $C_1$-$C_{100}$alkyl group, —COO$R^{124'}$, a $C_1$-$C_{100}$alkyl group which is substituted by one or more halogen atoms, hydroxyl groups, nitro groups, —CN, or $C_6$-$C_{18}$aryl groups and/or interrupted by —O—, —COO—, —OCO—, or —S—; a $C_7$-$C_{100}$arylalkyl group, a carbamoyl group, $C_5$-$C_{12}$cycloalkyl, which can be substituted one to three times with $C_1$-$C_8$alkyl and/or $C_1$-$C_8$alkoxy, a $C_6$-$C_{24}$aryl group, in particular phenyl or 1- or 2-naphthyl which can be substituted one to three times with $C_1$-$C_8$alkyl, $C_1$-$C_{24}$thioalkoxy, and/or $C_1$-$C_{24}$alkoxy, or pentafluorophenyl, $R^{124'}$ is $C_1$-$C_{50}$alkyl, especially $C_4$-$C_{25}$alkyl;

especially hydrogen, or a $C_1$-$C_{100}$alkyl group, very especially a $C_8$-$C_{36}$alkyl group, $R^{123}$ is a $C_1$-$C_{25}$alkyl group, especially a $C_6$-$C_{25}$alkyl, which may optionally be interrupted by one or more oxygen atoms, or a $C_1$-$C_{25}$alkoxy group, $R^{99}$ is a $C_1$-$C_{25}$alkyl group, especially a $C_6$-$C_{25}$alkyl, which may optionally be interrupted by one or more oxygen atoms, one of $X^1$ and $X^2$ is N and the other is CH, $R^{116}$ is H, or $C_1$-$C_{25}$alkyl, or phenyl, which can be substituted one to three times with $C_1$-$C_8$alkyl, and/or $C_1$-$C_{24}$alkoxy, $X^{11}$ is independently in each occurrence —B(OH)$_2$, —B(OY$^1$)$_2$, —B(OH)$_3^-$, —BF$_3^-$,

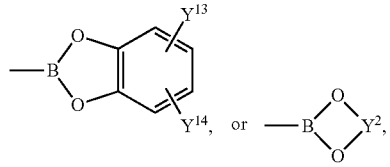

wherein $Y^1$ is independently in each occurrence a $C_1$-$C_{10}$alkyl group and $Y^2$ is independently in each occurrence a $C_2$-$C_{10}$alkylene group, such as —C$Y^3Y^4$—C$Y^5Y^6$—, or —C$Y^7Y^8$—C$Y^9Y^{10}$—C$Y^{11}Y^{12}$—, wherein $Y^3$, $Y^4$, $Y^5$, $Y^6$, $Y^7$, $Y^8$, $Y^9$, $Y^{10}$, $Y^{11}$ and $Y^{12}$ are independently of each other hydrogen, or a $C_1$-$C_{10}$alkyl group, especially —C(CH$_3$)$_2$C(CH$_3$)$_2$—, —C(CH$_3$)$_2$CH$_2$C(CH$_3$)$_2$—, or —CH$_2$C(CH$_3$)$_2$CH$_2$—, and $Y^{13}$ and $Y^{14}$ are independently of each other hydrogen, or a $C_1$-$C_{10}$alkyl group, $X^{11'}$ is halogen, such as Br, Cl, or I, especially Br.

More preferred "AA- and BB-type compounds" are compounds of formula Ia, Ii, Iq, and Is, and IIa, IIi, IIq, and IIs, respectively. Most preferred are compounds of formula IIa and IIi.

Additional examples of (hetero)aromatic compounds are, for example, described in U.S. Pat. No. 6,451,459B1, WO05/049695, EP1754736, WO08/000664, WO09/047104, PCT/EP2009/063767, PCT/EP2009/063769, PCT/EP2010/053655, PCT/EP2010/054152 and PCT/EP2010/056776, and can, for example, be represented by formula

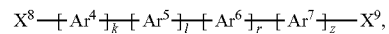

wherein k is 1, or 2, l is 0, or 1, r is 0, or 1, z is 0, or 1, and $Ar^4$, $Ar^5$, $Ar^6$ and $Ar^7$ are independently of each other a group of formula

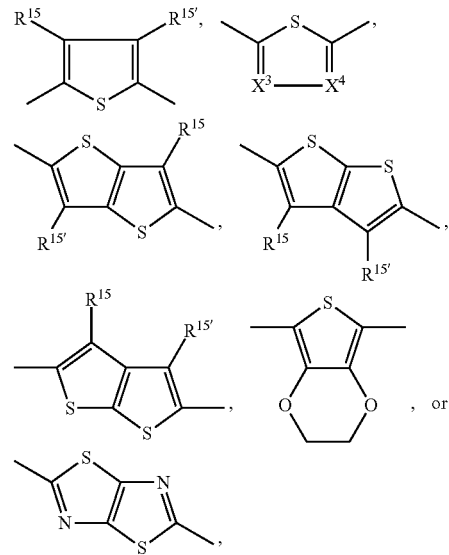

wherein $R^{15}$ and $R^{15'}$ are independently of each other H, or a $C_1$-$C_{25}$alkyl group, especially a $C_6$-$C_{25}$alkyl, which may optionally be interrupted by one or more oxygen atoms, and $R^{14}$ is a $C_1$-$C_{25}$alkyl group, especially a $C_6$-$C_{25}$alkyl, which may optionally be interrupted by one or more oxygen atoms, and one of $X^3$ and $X^4$ is N and the other is CR$^{99}$, $X^8$ and $X^9$ are as defined above;

$R^{99}$ is hydrogen, halogen, especially F, or a $C_1$-$C_{25}$alkyl group, especially a $C_4$-$C_{25}$alkyl, which may optionally be interrupted by one or more oxygen or sulphur atoms, $C_7$-$C_{25}$arylalkyl, or a $C_1$-$C_{25}$alkoxy group. Additional examples are compounds IIIo to IIIz, IIIa' to IIId' and IVo to IVz, Iva' to IVd'.

In said embodiment preferred "AA- and BB-type compounds" are compounds of formula IIIa to IIIz, IIIa' to IIId' and IVa to IVz, Iva' to IVd', respectively:

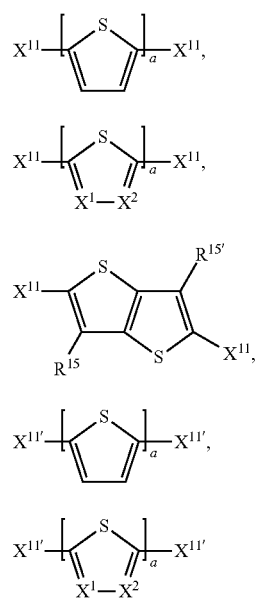
especially
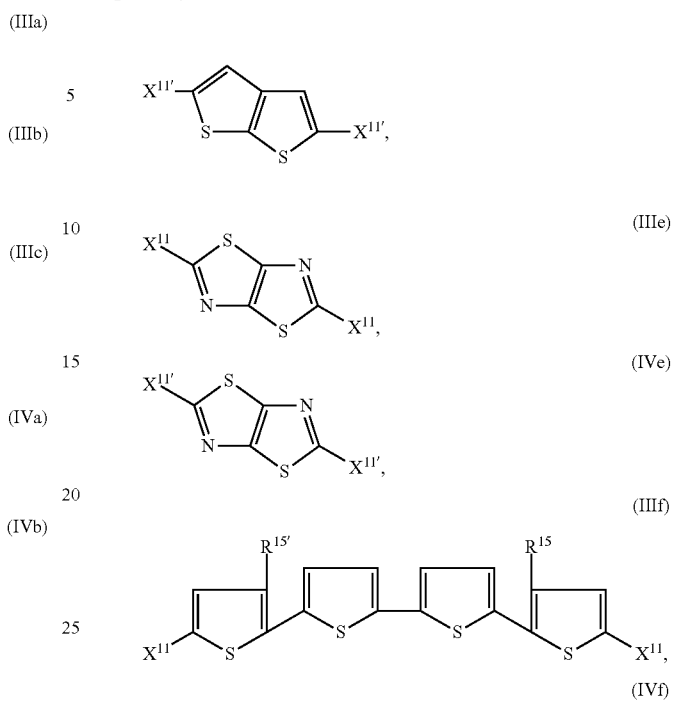
especially
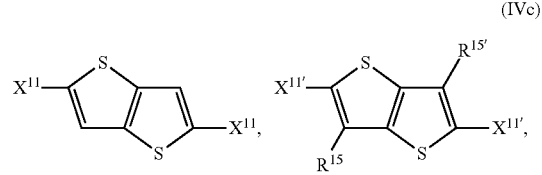
especially
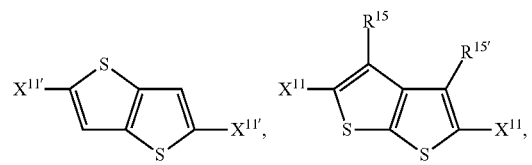
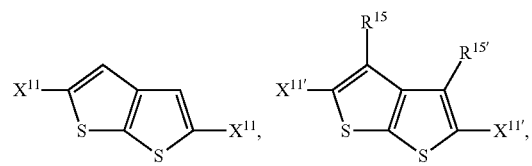

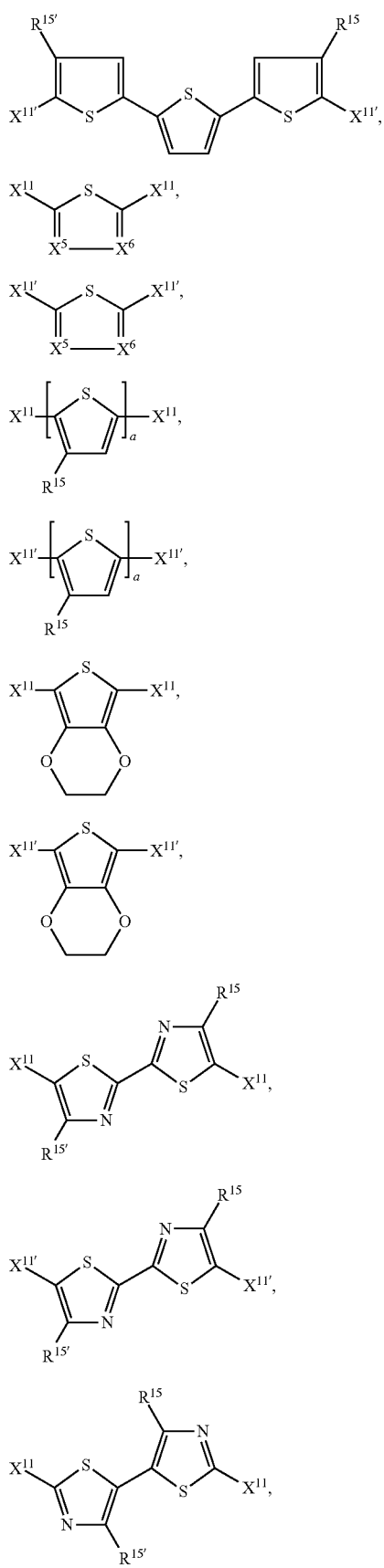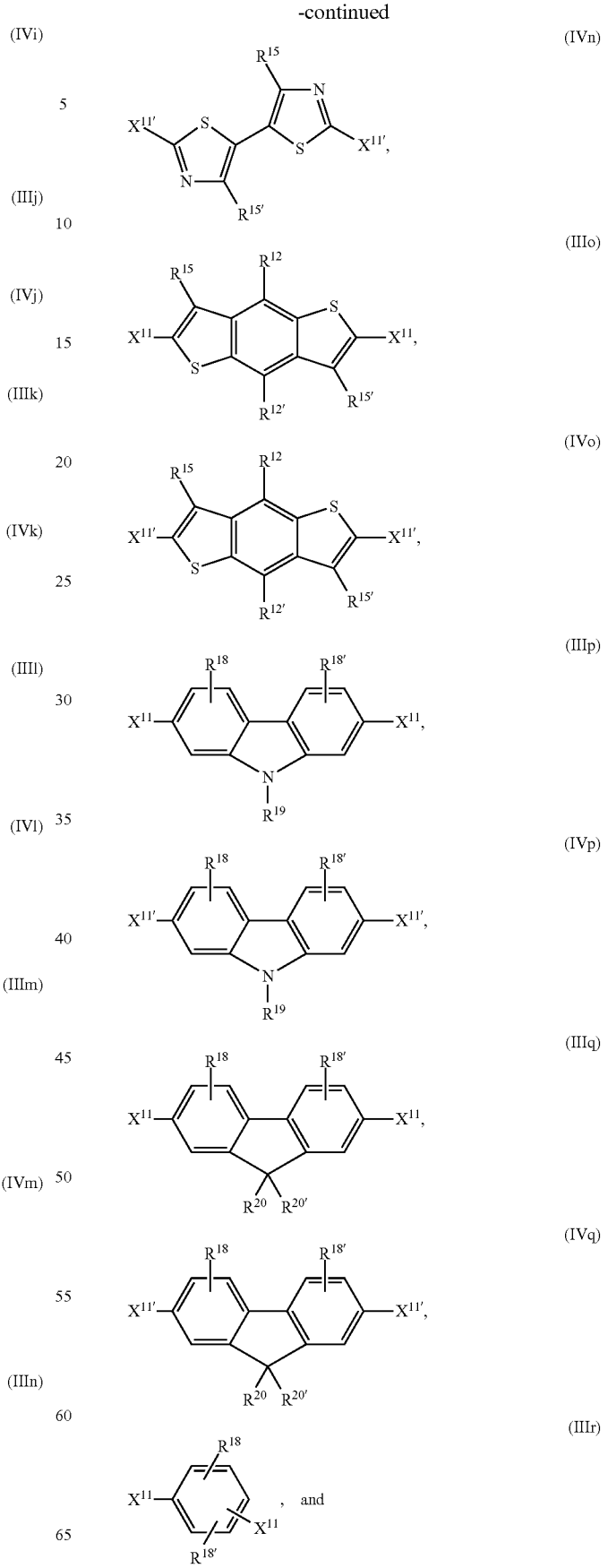

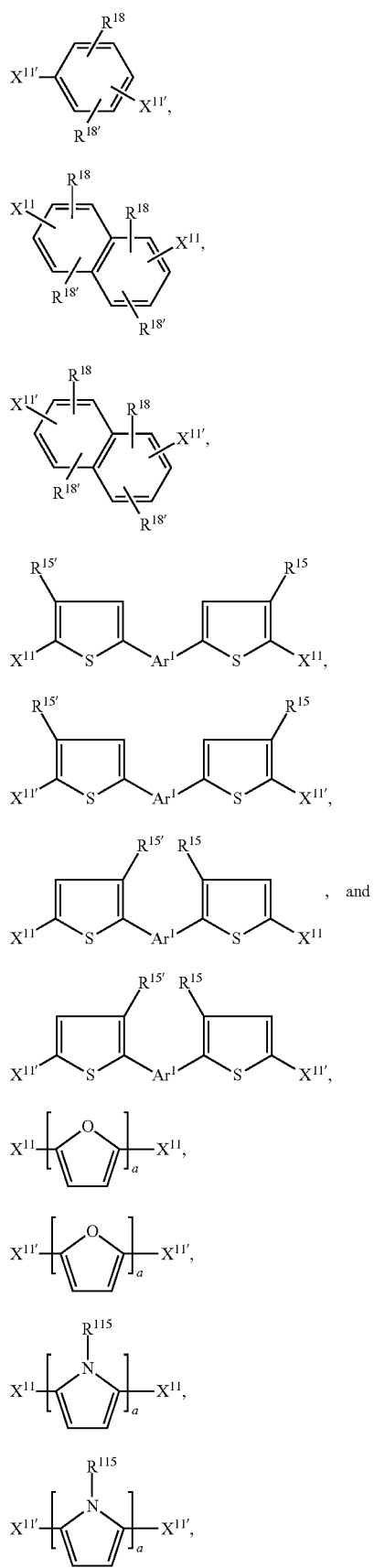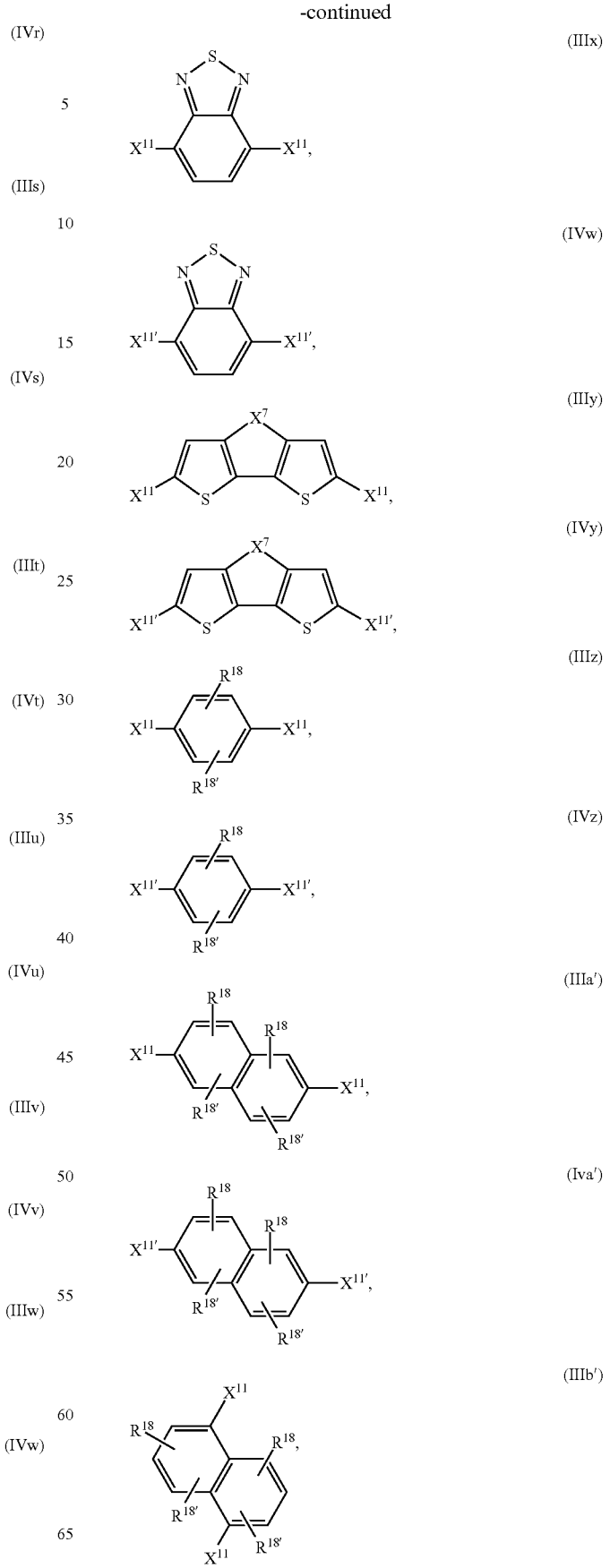

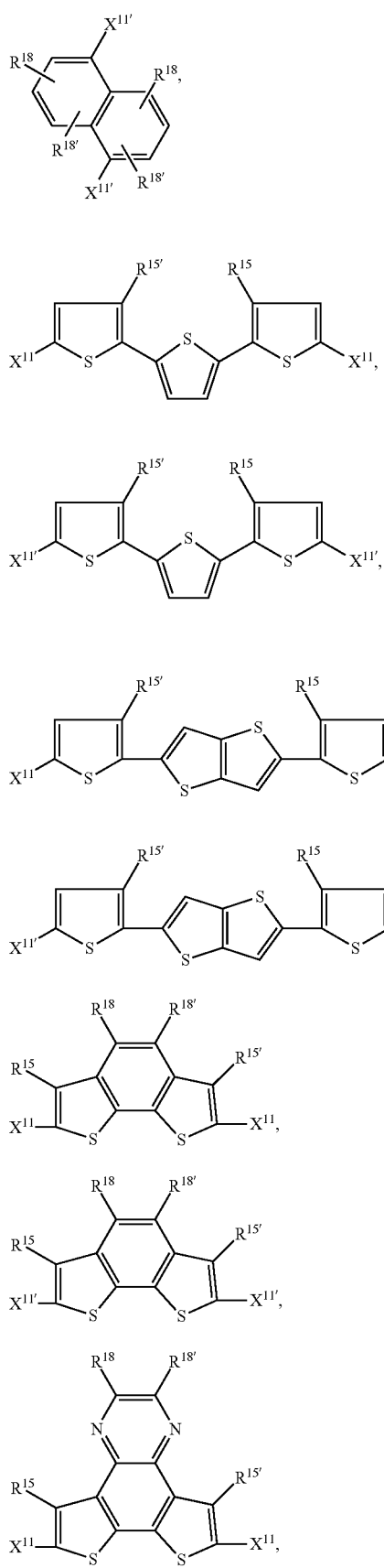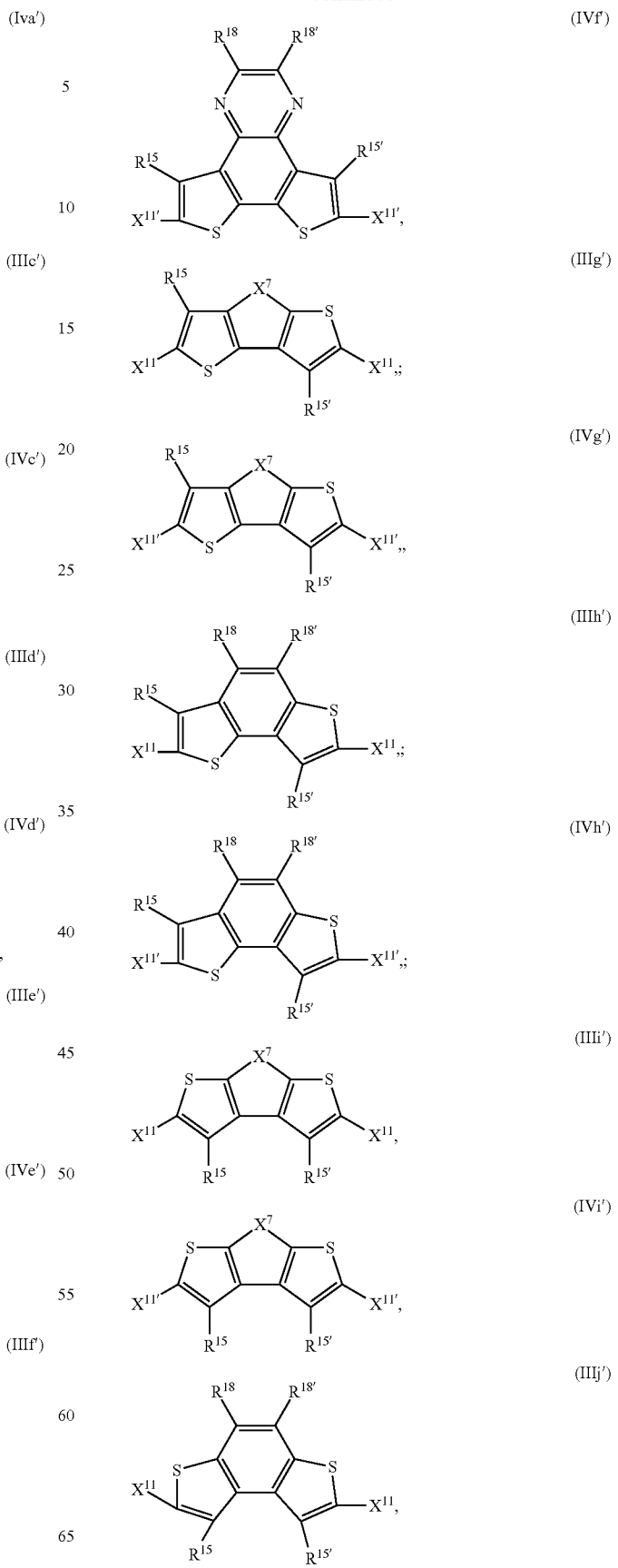

-continued

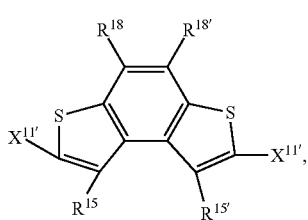

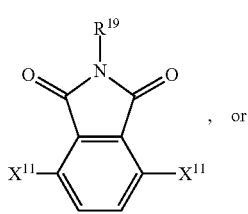, or

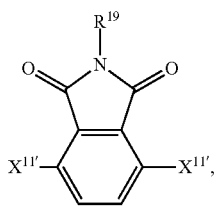, wherein
X⁷ is —O—, —S—, —NR¹¹⁵—, —Si(R¹¹⁷)₂—, or —C(R¹¹⁵)(R¹¹⁵')—,
a is an integer of 1 to 5, especially 1 to 3,
one of $X^1$ and $X^2$ is N and the other is CH,
one of $X^5$ and $X^6$ is N and the other is $CR^{14}$,
$Ar^1$ is an arylene group, such as

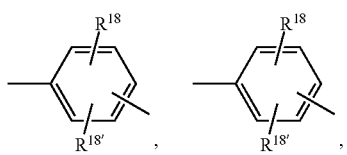

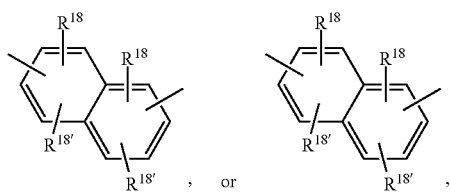

or a heteroarylene group, which is different from $AR^4$, $R^{115}$ is H, $C_1$-$C_{25}$alkyl, or phenyl, which can be substituted one to three times with $C_1$-$C_6$alkyl, and/or $C_1$-$C_{24}$alkoxy, $R^{117}$ is $C_1$-$C_{25}$alkyl, especially $C_1$-$C_{10}$alkyl, $R^{12}$ and $R^{12'}$ are independently of each other hydrogen, halogen, $C_1$-$C_{25}$alkyl, especially $C_4$-$C_{25}$alkyl, which may optionally be interrupted by one, or more oxygen, or sulphur atoms, $C_1$-$C_{25}$alkoxy, $C_7$-$C_{25}$arylalkyl, or ═══$R^{13}$, wherein $R^{13}$ is a $C_1$-$C_{10}$alkyl group, or a tri($C_1$-$C_8$alkyl)silyl group, $R^{15}$ and $R^{15'}$ are independently of each other H, or a $C_1$-$C_{25}$alkyl group, especially a $C_6$-$C_{25}$alkyl, which may optionally be interrupted by one or more oxygen atoms, and $R^{14}$ is a $C_1$-$C_{25}$alkyl group, especially a $C_6$-$C_{25}$alkyl, which may optionally be interrupted by one or more oxygen atoms, or $C_1$-$C_{25}$alkoxy;

$R^{18}$ and $R^{18'}$ independently of each other hydrogen, halogen, $C_1$-$C_{25}$alkyl, especially $C_4$-$C_{25}$alkyl, which may optionally be interrupted by one or more oxygen or sulphur atoms, $C_7$-$C_{25}$aralkyl, or $C_1$-$C_{25}$alkoxy;

$R^{19}$ is hydrogen, $C_7$-$C_{25}$aralkyl, $C_6$-$C_{18}$aryl; $C_6$-$C_{18}$aryl which is substituted by $C_1$-$C_{18}$alkyl, or $C_1$-$C_{18}$alkoxy; or $C_1$-$C_{25}$alkyl, especially $C_4$-$C_{25}$alkyl, which may optionally be interrupted by one or more oxygen or sulphur atoms;

$R^{20}$ and $R^{20'}$ are independently of each other hydrogen, $C_7$-$C_{25}$aralkyl, $C_1$-$C_{25}$alkyl, especially $C_4$-$C_{25}$alkyl, which may optionally be interrupted by one, or more oxygen, or sulphur atoms, $X^{11}$ is independently in each occurrence —B(OH)₂, —B(OY¹)₂, —B(OH)₃⁻, —BF₃⁻,

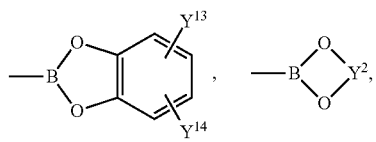

—BF₄Na, or —BF₄K, wherein $Y^1$ is independently in each occurrence a $C_1$-$C_{10}$alkyl group and $Y^2$ is independently in each occurrence a $C_2$-$C_{10}$alkylene group, such as —CY³Y⁴—CY⁵Y⁶—, or —CY⁷Y⁸—CY⁹Y¹⁰—CY¹¹Y¹²—, wherein $Y^3, Y^4, Y^5, Y^6, Y^7, Y^8, Y^9, Y^{10}, Y^{11}$ and $Y^{12}$ are independently of each other hydrogen, or a $C_1$-$C_{10}$alkyl group, especially —C(CH₃)₂C(CH₃)₂—, —C(CH₃)₂CH₂C(CH₃)₂—, or —CH₂C(CH₃)₂CH₂—, and $Y^{13}$ and $Y^{14}$ are independently of each other hydrogen, or a $C_1$-$C_{10}$alkyl group, $X^{11'}$ is halogen, such as Br, Cl, or I, especially Br.

More preferred "AA- and BB-type compounds" are compounds of formula IIIa, IIIc, IIIf, IIIo, IIIp, IIIq, IIIz, IIIe' and IVa, IVc, IVf, IVo, IVp, IVq, IVz and IVe', respectively.

Most preferred are compounds of formula IIIa, IIIc, IIIf, IIIo, IIIp, IIIq, IIIz, and IIIe' (comment to be deleted: the boronic ester of theses building blocks are most preferred, therefore compound III and not compound IV should be in the list).

"AB-type compounds" can be derived from "AA-type compounds" by replacing one $X^{11}$ group by a $X^{11'}$ group. Examples of such compounds are

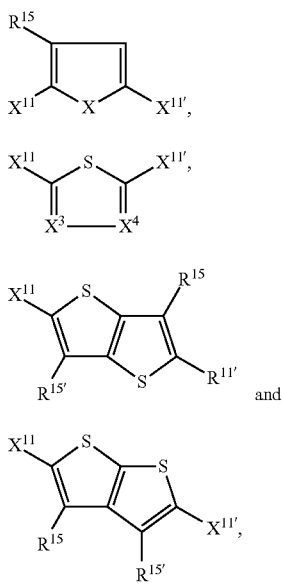

wherein $R^{15}$, $R^{15'}$, $X^{11}$, $X^{11'}$, $X^3$ and $X^4$ are as defined above.

Polymerization of "AB-type compounds" can result in homopolymers:

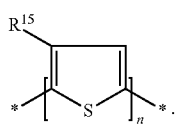

Homopolymers can be obtained by reacting "AA-type and BB-type compounds" which are only distinauished in the groups $X^{11}$ and $X^{11'}$:

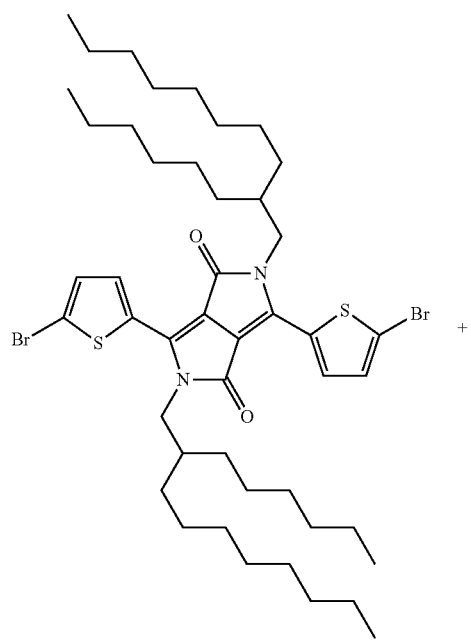

+

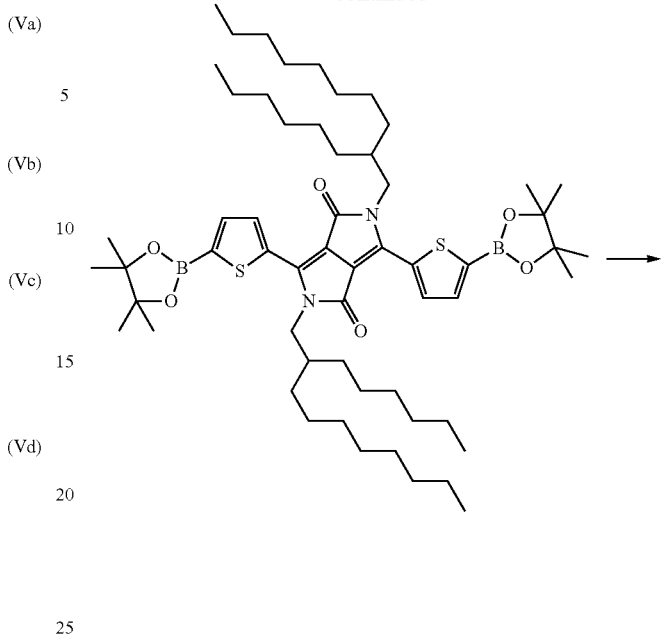

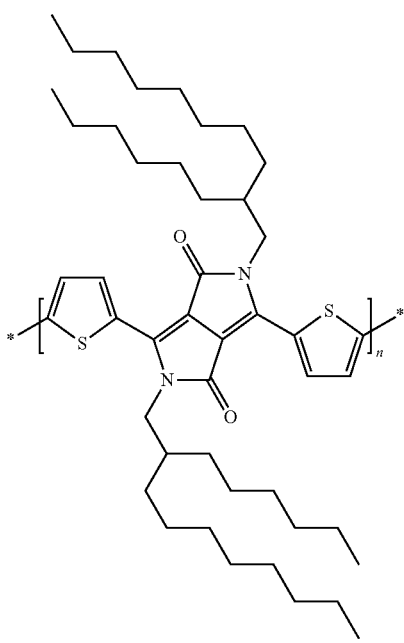

n is 4 to 1000, especially 4 to 200, very especially 5 to 100.
Examples of particularly preferred copolymers are shown below:

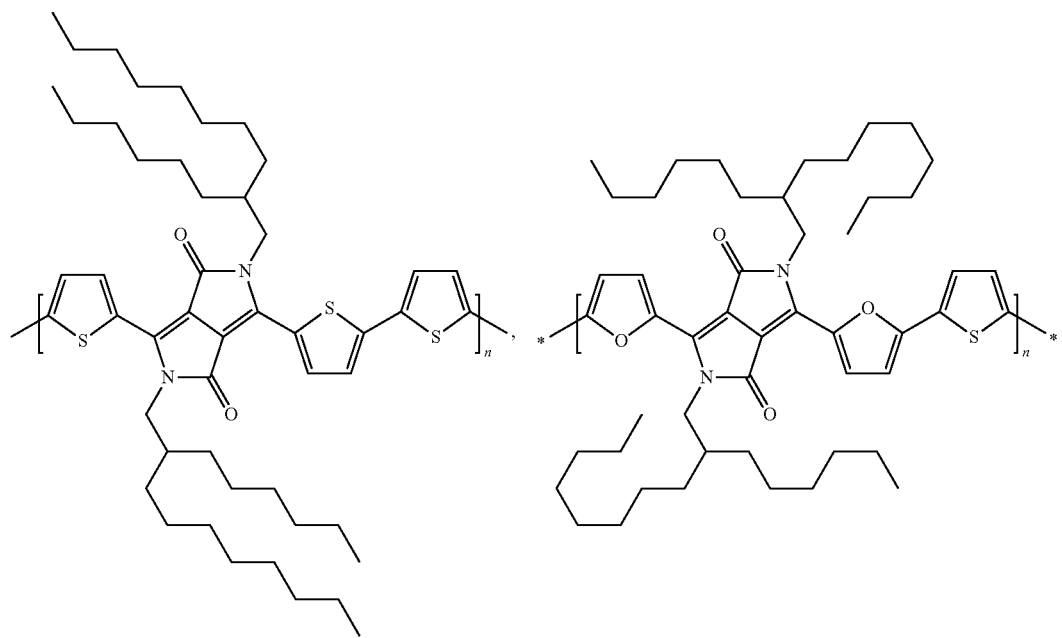
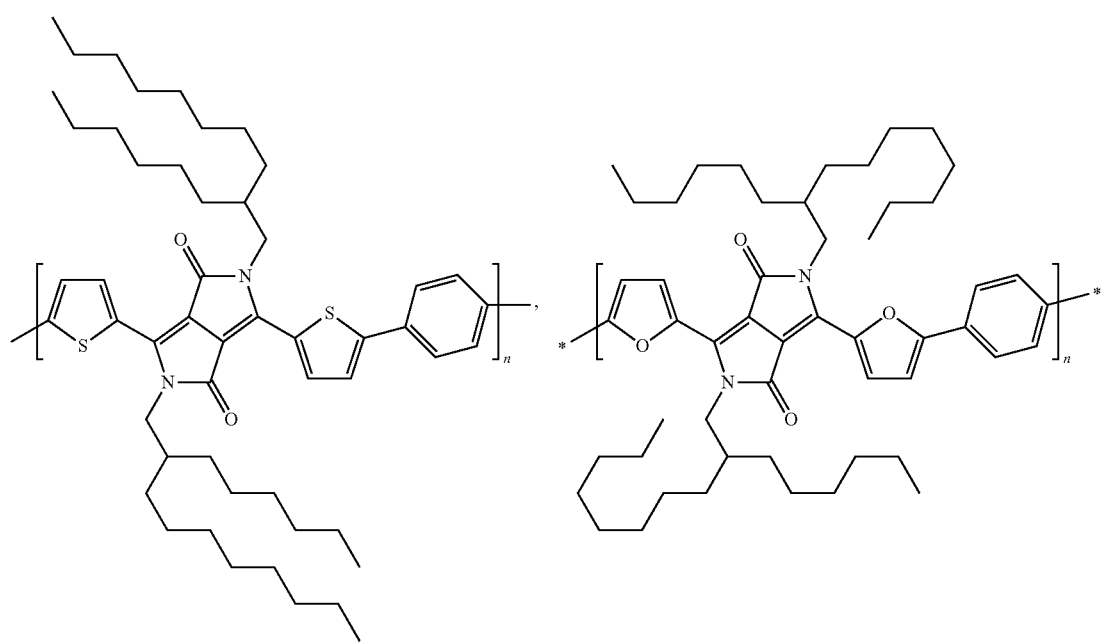

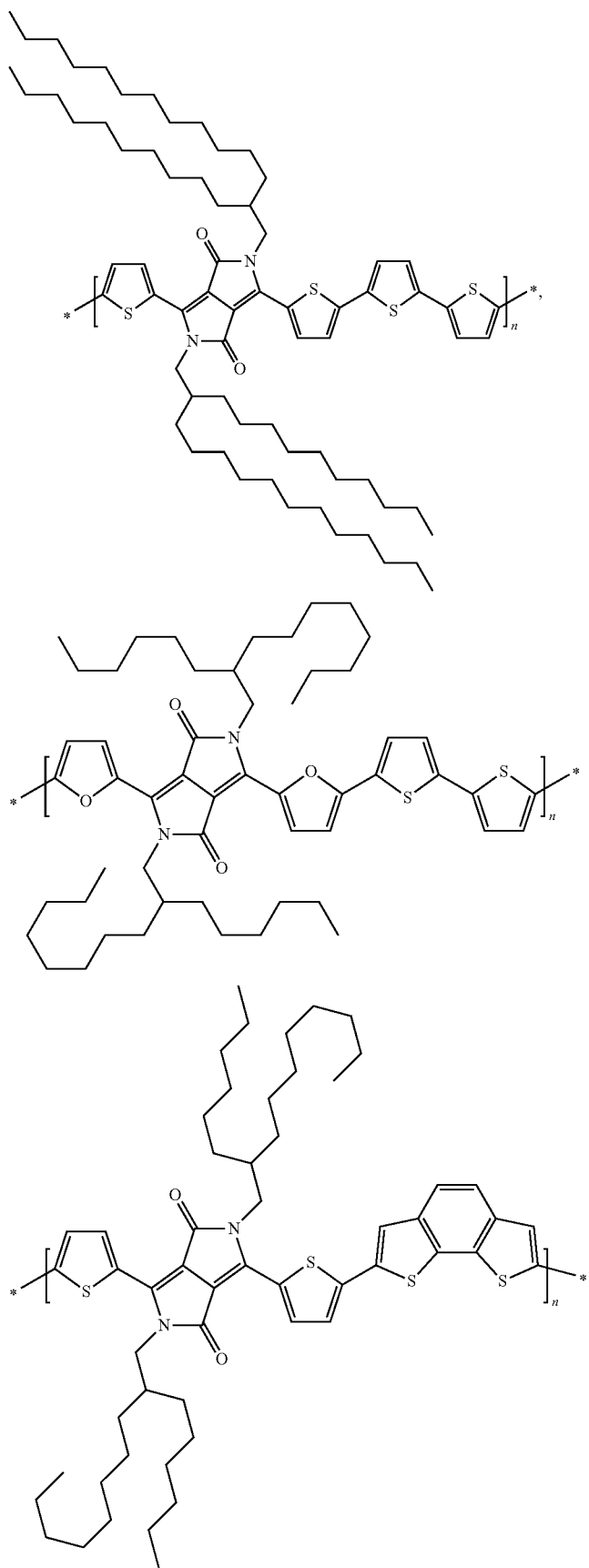

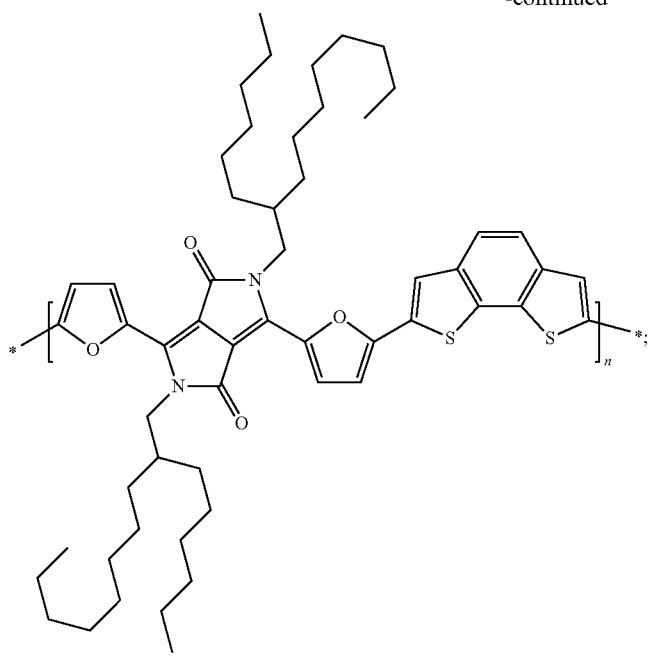
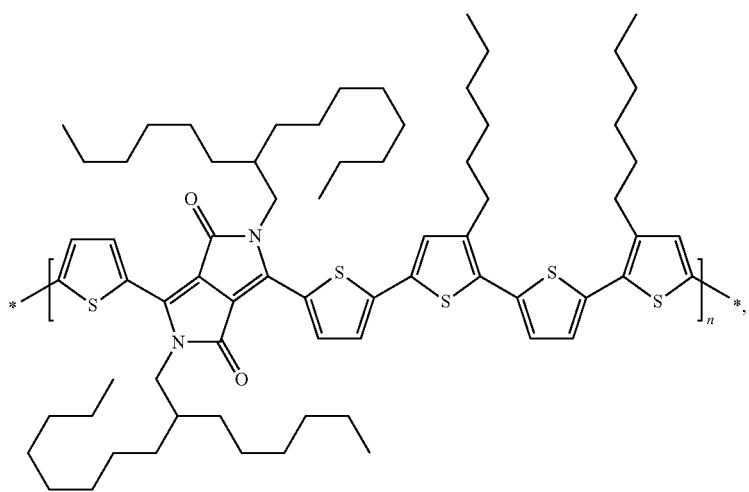
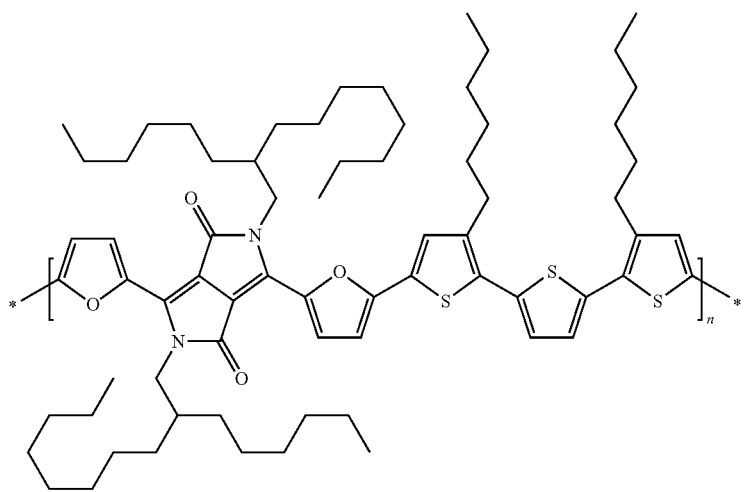

-continued
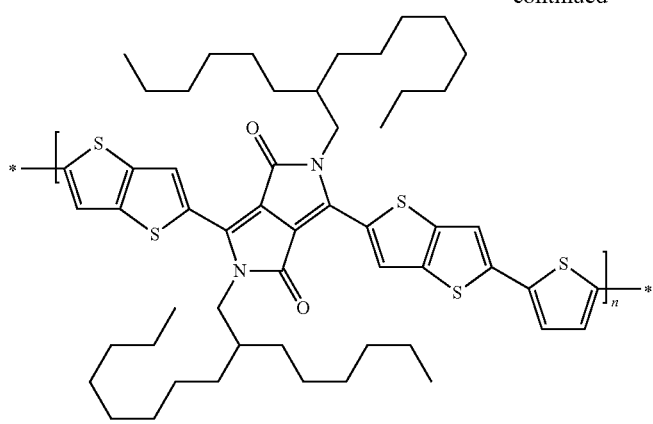
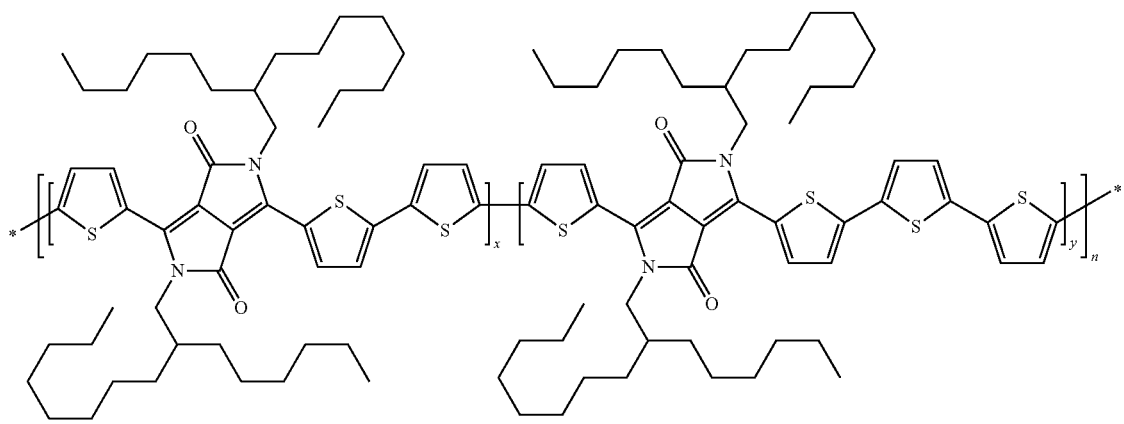
(x = 0.2 to 0.998 and y = 0.8 to 0.002),
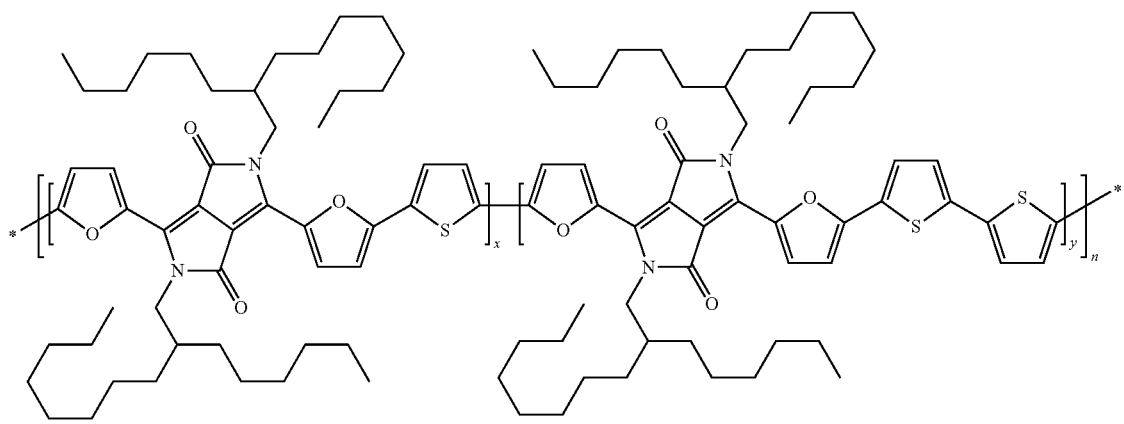
(x = 0.2 to 0.998 and y = 0.8 to 0.002),

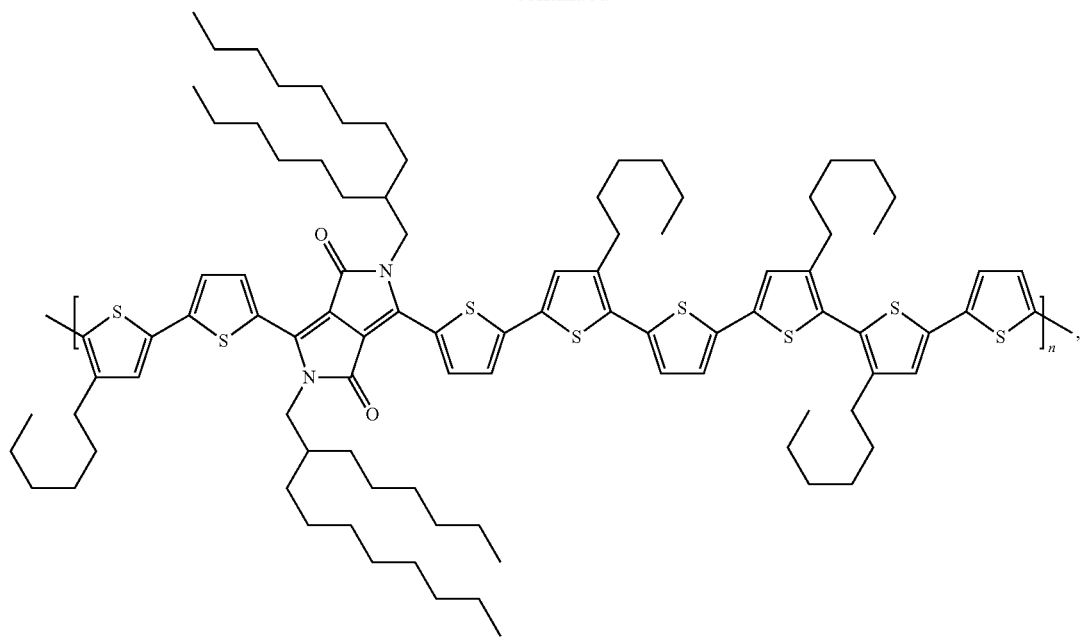
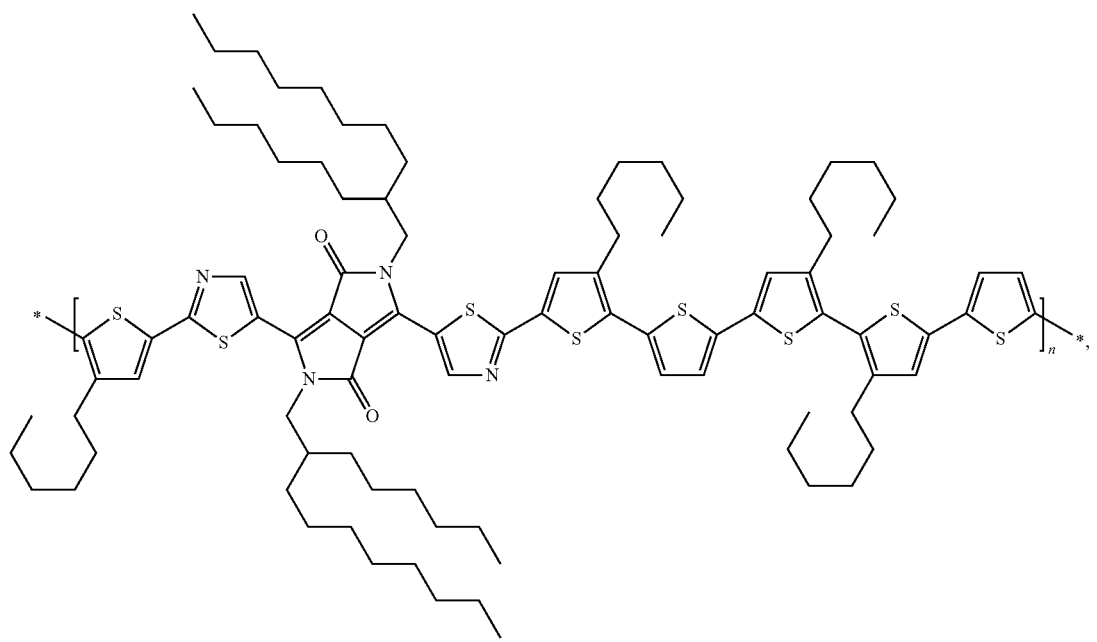

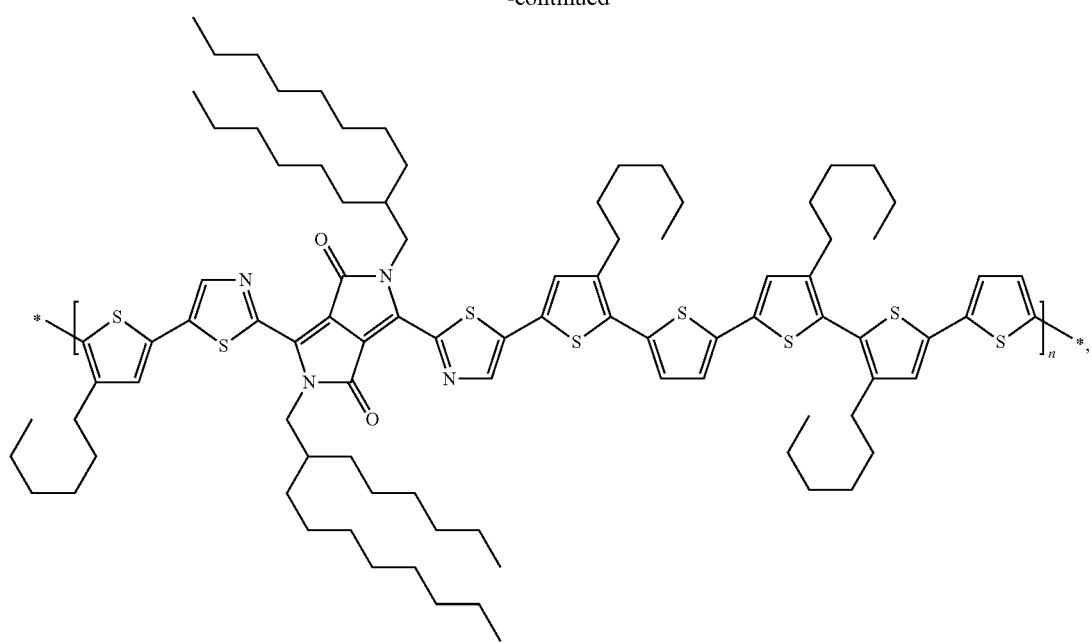
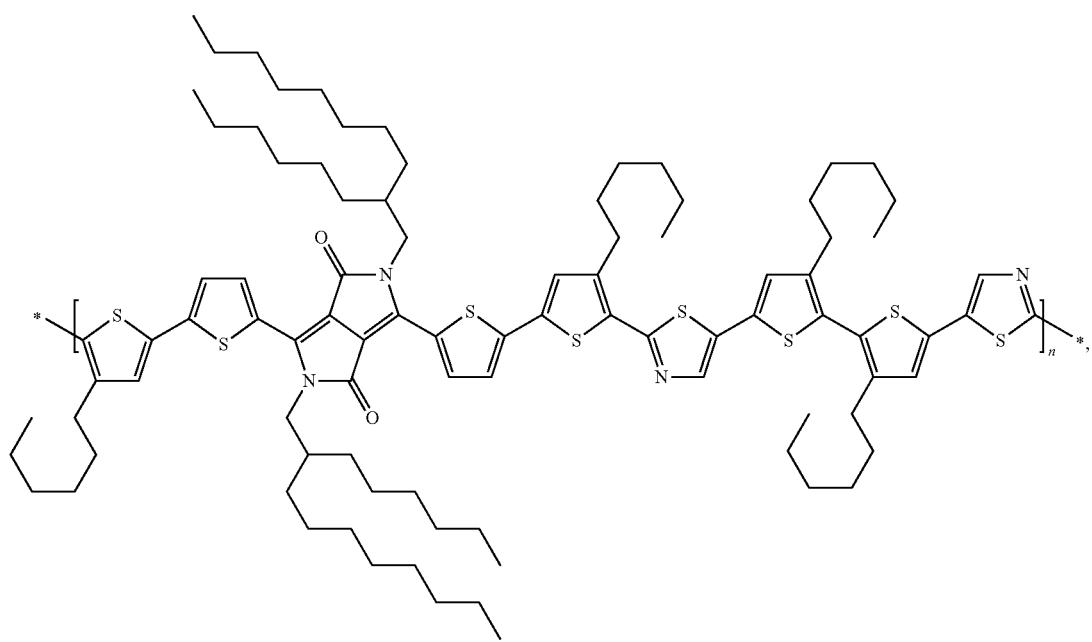

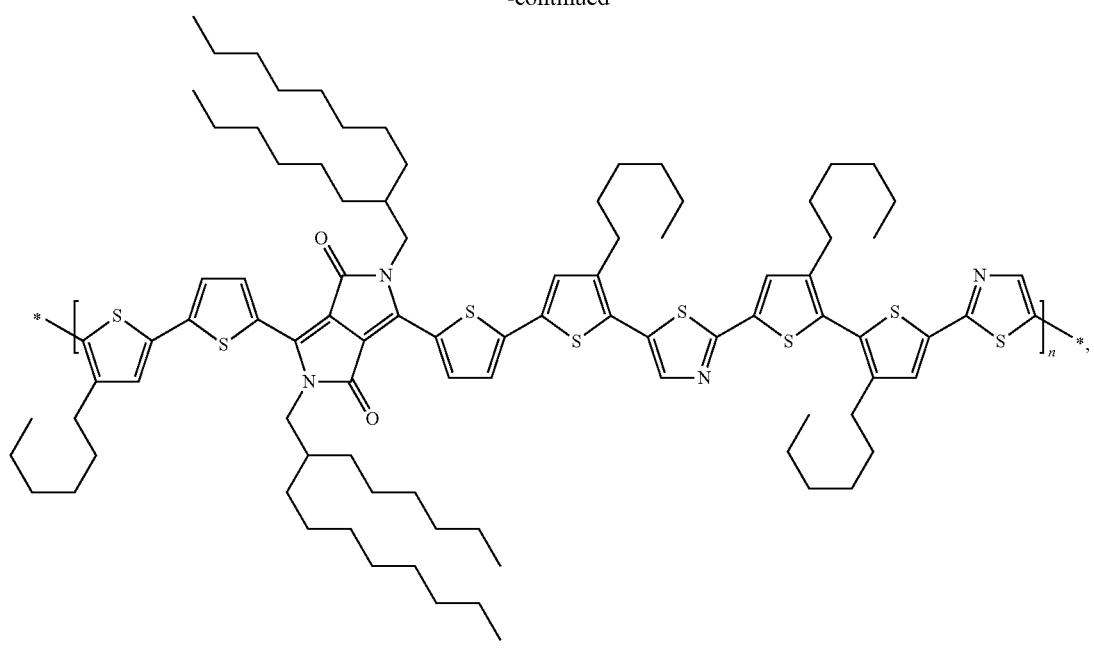
n is 4 to 200, very especially 15 to 100;
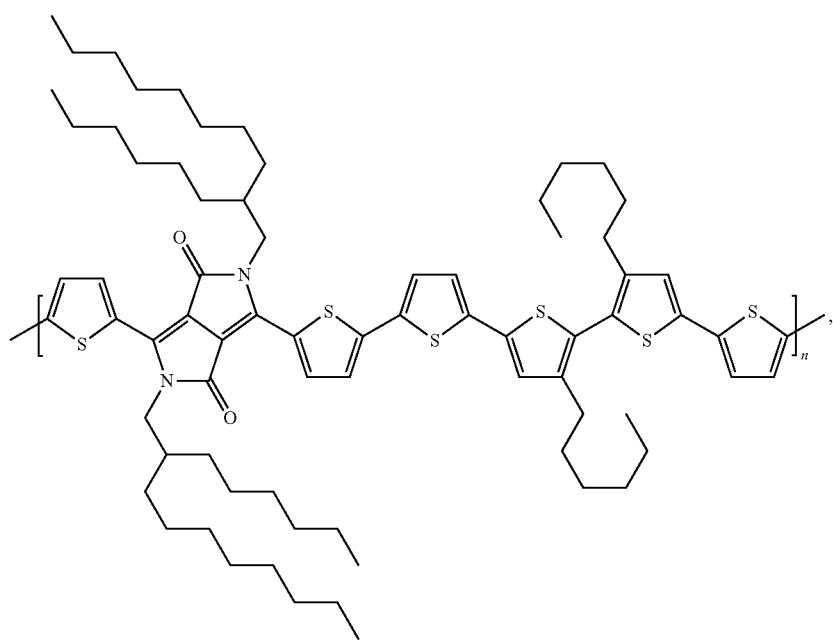

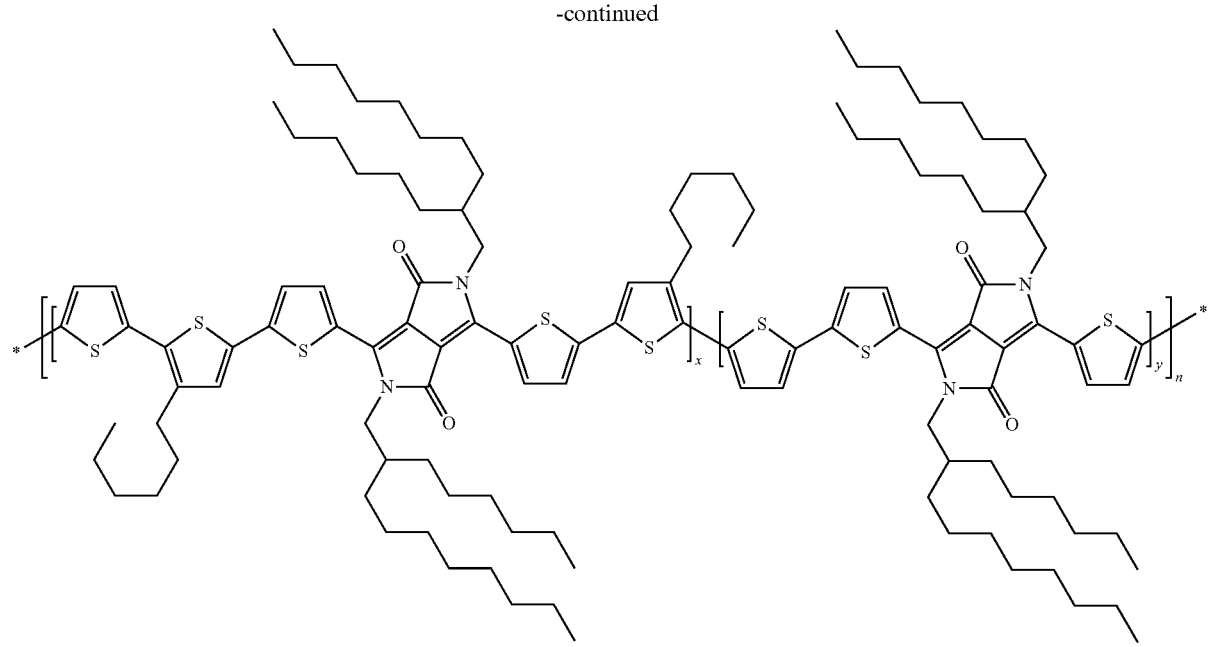
(x = 0.2 to 0.8 and y = 0.8 to 0.2),
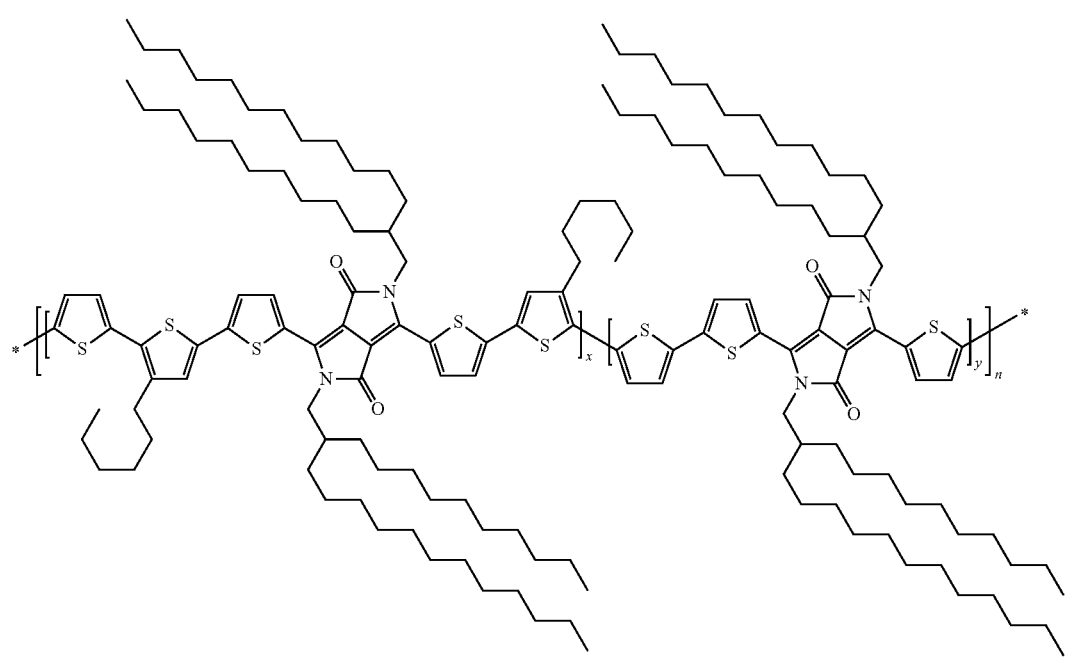
(x = 0.2 to 0.8 and y = 0.8 to 0.2), -continued
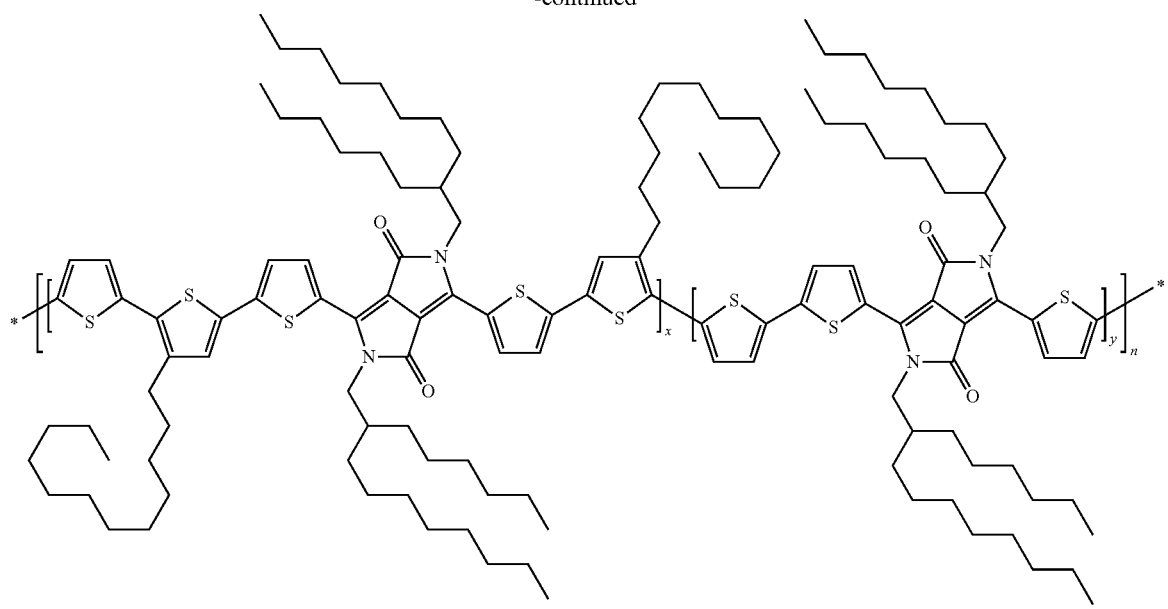
(x = 0.2 to 0.8 and y = 0.8 to 0.2),
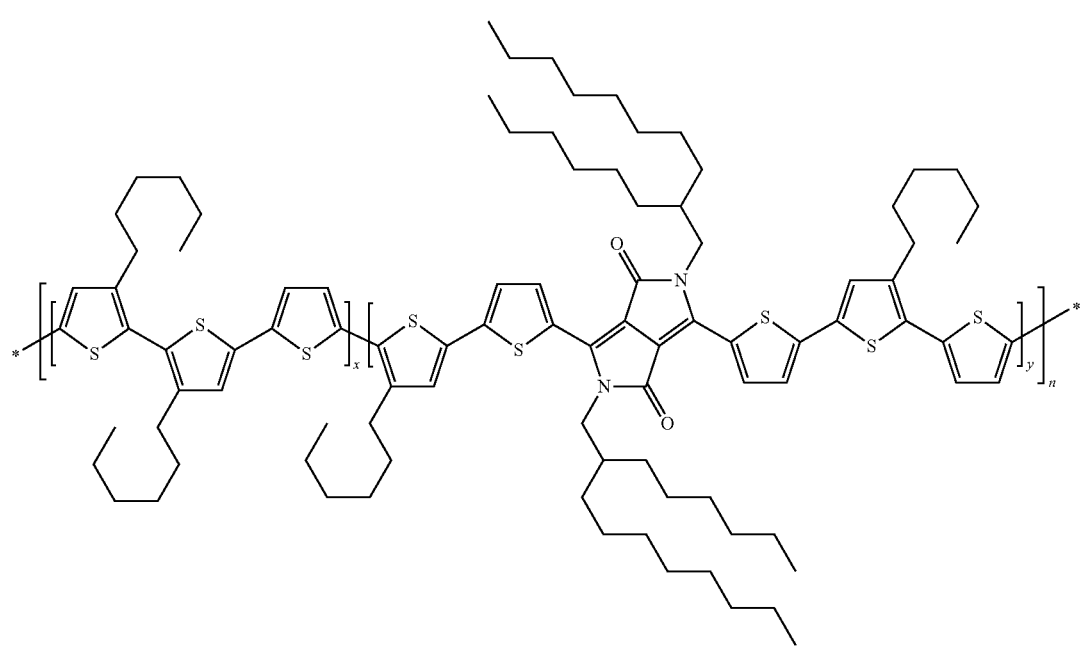
(x = 0.05 to 0.8 and y = 0.95 to 0.2),

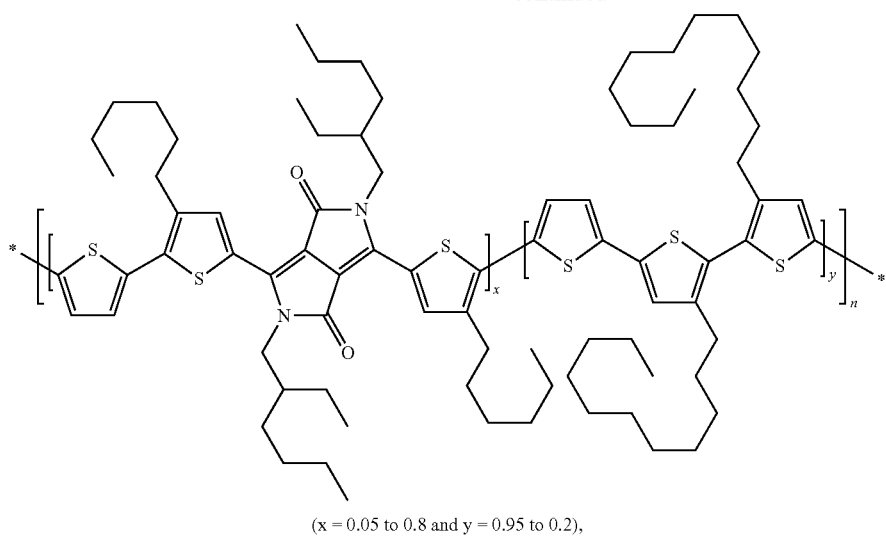
(x = 0.05 to 0.8 and y = 0.95 to 0.2),
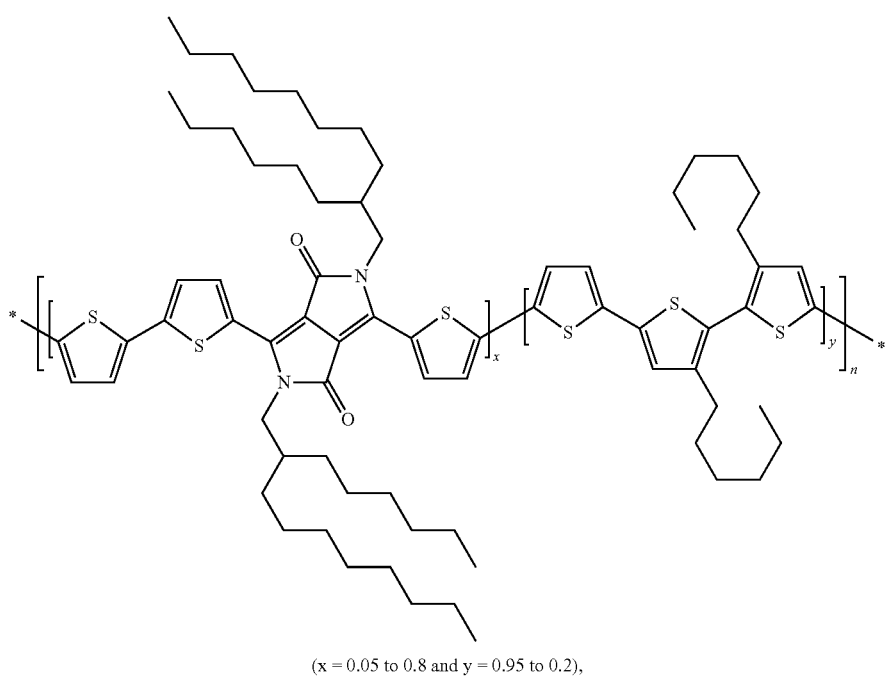
(x = 0.05 to 0.8 and y = 0.95 to 0.2), -continued
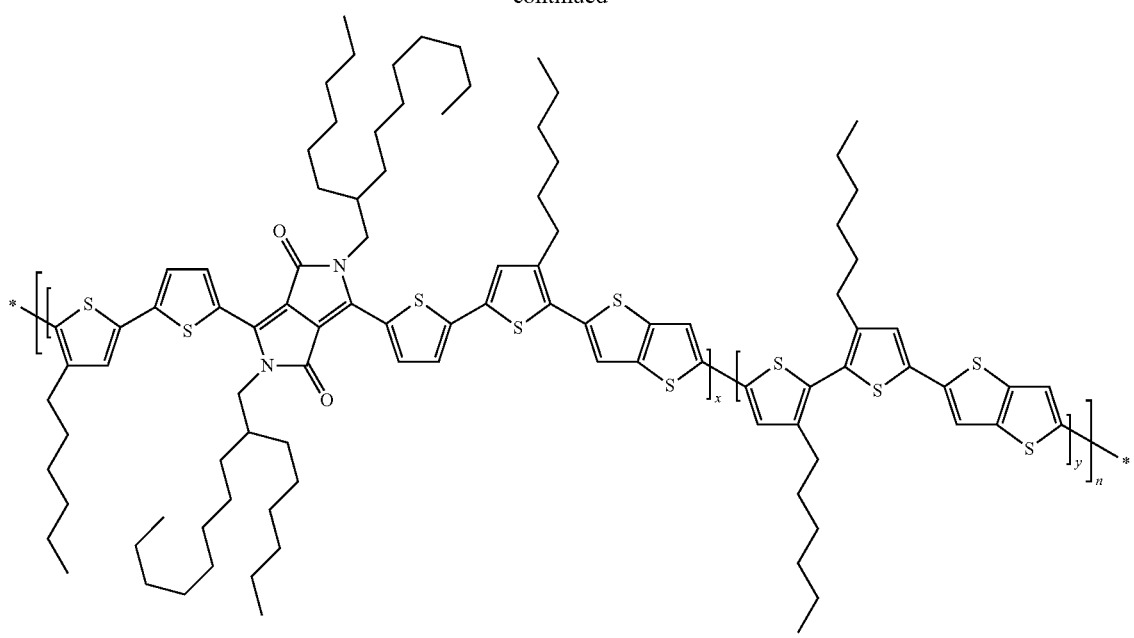
(x = 0.2 to 0.8 and y = 0.8 to 0.2),
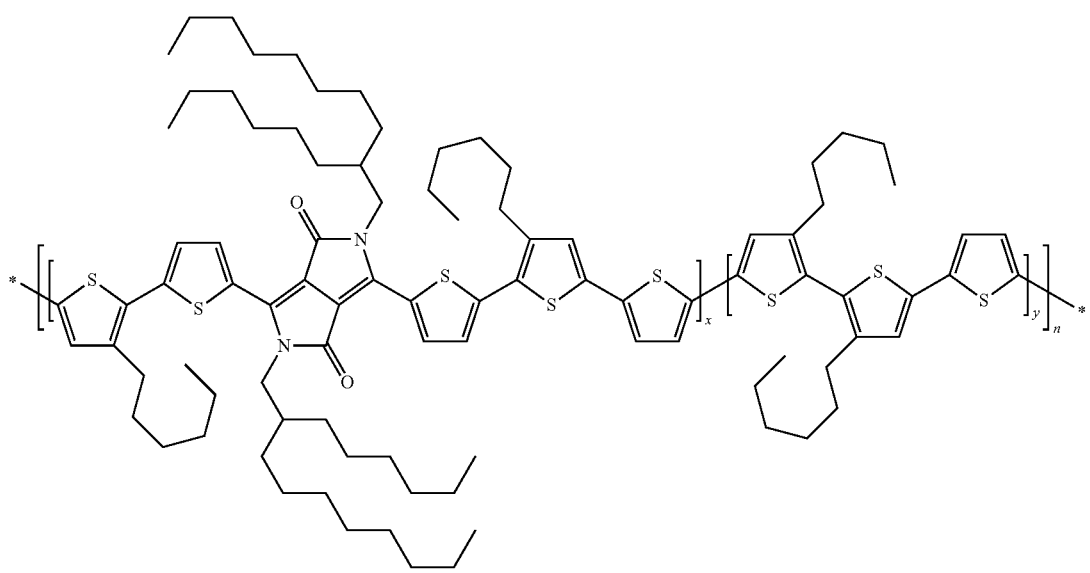
(x = 0.2 to 0.8 and y = 0.8 to 0.2), -continued

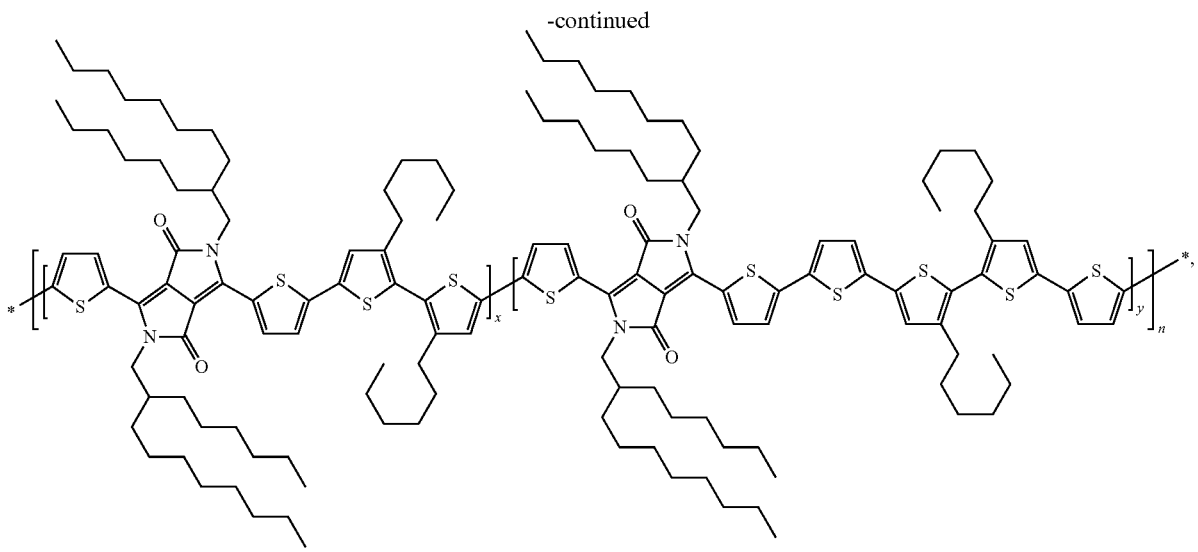

(x = 0.2 to 0.8 and y = 0.8 to 0.2)

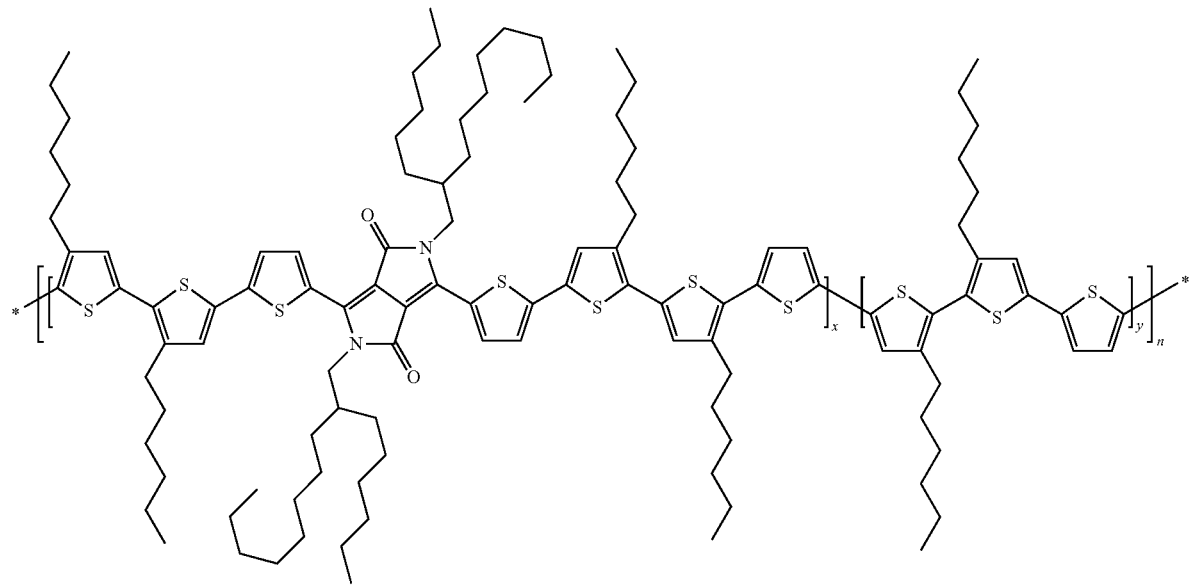

(x = 0.2 to 0.8 and y = 0.8 to 0.2)

n is 4 to 200, very especially 15 to 100.

Detailed description of the reactions which are carried out by the process according to the invention:

Copolymers of formula

(VI)

can be obtained, for example, by the Suzuki reaction. The condensation reaction of an aromatic boronate and a halogenide, especially a bromide, commonly referred to as the "Suzuki reaction", is tolerant of the presence of a variety of organic functional groups as reported by N. Miyaura and A. Suzuki in Chemical Reviews, Vol. 95, pp. 457-2483 (1995). Preferred catalysts are 2-dicyclohexylphosphino-2',6'-dialkoxybiphenyl/palladium(II)acetates, tri-alykl-phosphonium salts/palladium (0) derivatives and tri-alkylphosphine/palladium (0) derivatives. Especially preferred catalysts are 2-dicyclohexylphosphino-2',6'-di-methoxybiphenyl (sPhos)/palladium(II)acetate and, tri-tert-butylphosphonium tetrafluoroborate ((t-Bu)₃P*HBF₄)/tris(dibenzylideneacetone) dipalladium (0) (Pd₂(dba)₃) and tri-tert-butylphosphine (t-Bu)₃P/tris(dibenzylideneacetone) dipalladium (0) (Pd₂(dba)₃). This reaction can be applied to preparing high molecular weight polymers and copolymers. Preferably the process according to the invention is used to prepare high molecular weight polymers.

To prepare polymers corresponding to formula

(VI)

a dihalogenide of formula $X^{11'}$-A-$X^{11'}$ is reacted with an equimolar amount of a diboronic acid or diboronate corresponding to formula

or a dihalogenide of formula $X^{11'}$—$COM^1$-$X^{11'}$ is reacted with an equimolar amount of a diboronic acid or diboronate corresponding to formula $X^{11}$-A-$X^{11}$, wherein n is 4 to 1000, especially 4 to 200, very especially 5 to 100, A and $COM^1$ are independently of each other a group of formula

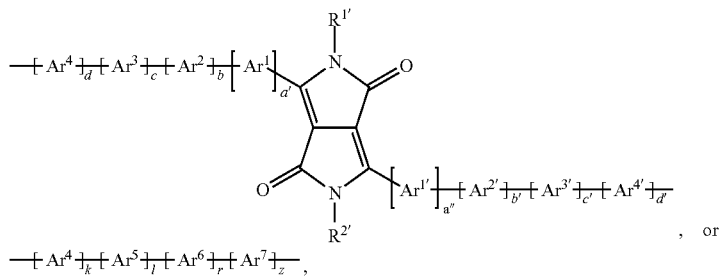

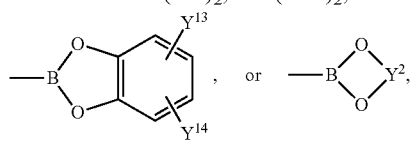

, or $X^{11'}$ is halogen, especially Br, and $X^{11}$ is independently in each occurrence —B(OH)$_2$, —B(OY$^1$)$_2$, wherein $Y^1$ is independently in each occurrence a $C_1$-$C_{10}$alkyl group and $Y^2$ is independently in each occurrence a $C_2$-$C_{10}$alkylene group, such as —CY$^3$Y$^4$—CY$^5$Y$^6$—, or —CY$^7$Y$^8$—CY9Y$^{10}$—CY$^{11}$Y$^{12}$—, wherein Y$^3$, Y$^4$, Y$^5$, Y$^6$, Y$^7$, Y$^8$, Y$^9$, Y$^{10}$, Y$^{11}$ and Y$^{12}$ are independently of each other hydrogen, or a $C_1$-$C_{10}$alkyl group, especially —C(CH$_3$)$_2$C (CH$_3$)$_2$—, —C(CH$_3$)$_2$CH$_2$C(CH$_3$)$_2$—, or —CH$_2$C(CH$_3$)$_2$ CH$_2$—, and Y$^{13}$ and Y$^{14}$ are independently of each other hydrogen, or a $C_1$-$C_{10}$alkyl group, in a solvent and in the presence of a catalyst. The reaction is typically conducted at about 0° C. to 180° C. in an aromatic hydrocarbon solvent such as toluene, xylene. Other solvents such as dimethylformamide, dioxane, dimethoxyethan and tetrahydrofuran can also be used alone, or in mixtures with an aromatic hydrocarbon. An aqueous base, preferably sodium carbonate or bicarbonate, potassium phosphate, potassium carbonate or bicarbonate is used as activation agent for the boronic acid, boronate and as the HBr scavenger.

A polymerization reaction may take 0.1 to 5 hours.

Preferably, the reaction time is equal or less than 2 hours. And even more preferred is a reaction time which is equal or less than 1 hour. Organic bases, such as, for example, tetraalkylammonium hydroxide, and phase transfer catalysts, such as, for example TBAB, can promote the activity of the boron (see, for example, Leadbeater & Marco; Angew. Chem. Int. Ed. Eng. 42 (2003) 1407 and references cited therein). Other variations of reaction conditions are given by T. I. Wallow and B. M. Novak in J. Org. Chem. 59 (1994) 5034-5037; and M. Remmers, M. Schulze, and G. Wegner in Macromol. Rapid Commun. 17 (1996) 239-252. Control of molecular weight is possible by using either an excess of dibromide, diboronic acid, or diboronate, or a chain terminator.

The polymerisation is carried out in presence of
a) a catalyst/ligand system comprising a palladium catalyst and an organic phosphine or phosphonium compound,
b) a base,
c) a solvent or a mixture of solvents.

The phosphine compound is an organic trisubstituted phosphine ligand that is capable of coordinating to the Pd atom. The phosphine ligand is formed in situ from the corresponding phosphonium salt during the process by the addition of base. Alternatively, the phosphine ligand is directly employed in the process.

Preferred phosphine ligands are selected from the formula $R^a{}_xR^b{}_yR^c{}_zP$, wherein P denotes phosphorus, $R^a$, $R^b$ and $R^c$ are identical or different straight-chain, branched or cyclic alkyl groups with 1 to 12 C atoms that are optionally fluorinated, aryl groups with 4 to 20 C atoms, that are optionally substituted, or heteroaryl groups with 4 to 20 C atoms, that are optionally substituted, x, y and z are 0, 1, 2 or 3, with x+y+z=3.

In a preferred embodiment the organic phosphine or phosphonium salt comprises at least one substituent $R^a$, $R^b$ and $R^c$ that is an alkyl group as defined above. Especially preferred are ligands of the formula $R^a{}_3P$ wherein all groups $R^a$ are identical. Further preferred are ligands of the formula $R^a{}_2R^bP$ or $R^aR^b{}_2P$, wherein $R^a$ and $R^b$ are different. Further preferred are ligands wherein $R^a$ and $R^b$ are alkyl as defined above, and ligands wherein $R^a$ is an alkyl group and $R^b$ an aryl group as defined above. Preferred alkyl and aryl groups are those as defined above for R.

Examples of preferred ligands are triethylphosphine, tri-iso-propyl-phosphine, tri-cyclohexylphosphine, tri-tert-butylphosphine (t-Bu), bis(di-tert-butylphosphino)methane and 2-dicyclohexylphosphino-2',6'-dimethoxybiphenyl.

Preferred phosphonium salts are selected from the formula $[R^a{}_x, R^b{}_y, R^c{}_z, PH]^+Z^-$ wherein $R^{a-c}$ and x, y and z are as defined above and $Z^-$ is a suitable anion, like for example $BF_4{}^-$, $PF_6{}^-$ or $SbF_6{}^-$. Especially preferred are the corresponding phosphonium salts, for example phosphonium tetrafluoroborates, of the above mentioned preferred phosphine ligands. Most preferred are t-Bu3P and [t-Bu$_3$PH]BF$_4$.

In another preferred embodiment the organic phosphine is a trisubstituted phosphine of formula (VI)

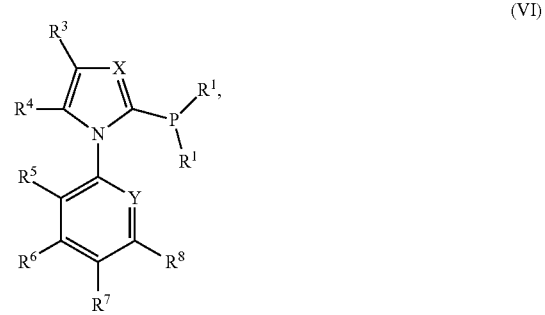

or phosphonium salt thereof, wherein X independently of Y represents a nitrogen atom or a C—$R^2$ group and Y independently of X represents a nitrogen atom or a C—$R^9$ group, $R^1$ for each of the two $R^1$ groups independently of the other represents a radical selected from the group $C_1$-$C_{24}$-alkyl, $C_3$-$C_{20}$-cycloalkyl, which includes especially both monocyclic and also bi-and tri-cyclic cycloalkyl radicals, $C_5$-$C_{14}$-aryl, which includes especially the phenyl, naphthyl, fluorenyl radical, $C_2$-$C_{13}$-heteroaryl, wherein the number of hetero atoms, selected from the group N, O, S, may be from 1 to 2, wherein the two radicals $R^1$ may also be linked to one another, and wherein the above-mentioned radicals $R^1$ may themselves each be mono-or poly-substituted independently of one another by substituents selected from the group hydrogen, $C_1$-$C_{20}$-alkyl, $C_2$-$C_{20}$-alkenyl, $C_3$-$C_8$-cycloalkyl, $C_2$-$C_9$-hetero-alkyl, $C_5$-$C_{10}$-aryl, $C_2$-$C_9$-heteroaryl, wherein the number of hetero atoms from the group N, O, S may be from 1 to 4, $C_1$-$C_{20}$-alkoxy, $C_1$-$C_{10}$-haloalkyl, hydroxy, amino of the forms NH—($C_1$-$C_{20}$-alkyl), NH—($C_5$-$C_{10}$-aryl), N($C_1$-$C_{20}$-alkyl)$_2$, N($C_1$-$C_{20}$-alkyl) ($C_5$-$C_{10}$-aryl), N($C_5$-$C_{10}$-aryl)$_2$, N($C_1$-$C_{20}$-alkyl/$C_5$-$C_{10}$-aryl$_3$)$_3^+$, NH—CO—$C_1$-$C_{20}$-alkyl, NH—CO—$C_5$-$C_{10}$-aryl, carboxylato of the forms COOH and COOQ (wherein Q represents either a monovalent cation or $C_1$-$C_8$-alkyl), $C_1$-$C_6$-acyloxy, sulfinato, sulfonato of the forms $SO_3H$ and $SO_3Q'$ (wherein Q' represents either a monovalent cation, $C_1$-$C_{20}$-alkyl, or $C_5$-$C_{10}$-aryl), tri-$C_1$-$C_6$-alkylsilyl, wherein two of the mentioned substituents may also be bridged with one another, $R^2$-$R^9$ represent a hydrogen, alkyl, alkenyl, cycloalkyl, aromatic or heteroaromatic aryl, O-alkyl, NH-alkyl, N-(alkyl)$_2$, O-(aryl), NH-(aryl), N-(alkyl)(aryl), O—CO-alkyl, O—CO-aryl, F, Si(alkyl)$_3$, $CF_3$, CN, $CO_2H$, COH, $SO_3H$, $CONH_2$, CONH(alkyl), CON(alkyl)$_2$, $SO_2$(alkyl), SO(alkyl), SO(aryl), $SO_2$(aryl), $SO_3$(alkyl), $SO_3$(aryl), S-alkyl, S-aryl, NH—CO(alkyl), $CO_2$(alkyl), $CONH_2$, CO(alkyl), NHCOH, $NHCO_2$(alkyl), CO(aryl), $CO_2$(aryl) radical, wherein two or more adjacent radicals, each independently of the other (s), may also be linked to one another so that a condensed ring system is present and wherein in $R^2$ to $R^9$ alkyl represents a hydrocarbon radical having from 1 to 20 carbon atoms which may in each case be linear or branched, alkenyl represents a mono- or poly-unsaturated hydrocarbon radical having from 2 to 20 carbon atoms which may in each case be linear or branched, cycloalkyl represents a hydrocarbon having from 3 to 20 carbon atoms, aryl represents a 5- to 14-membered aromatic radical, wherein from one to four carbon atoms in the aryl radical may also be replaced by hetero atoms from the group nitrogen, oxygen and sulfur so that a 5- to 14-membered heteroaromatic radical is present, wherein the radicals $R^2$ to $R^9$ may also carry further substituents as defined for $R^1$. Reference is made to PCT/EP2010/056776.

The organic phosphines and their synthesis are described in WO2004101581.

Preferred organic phosphines are selected from trisubstituted phosphines of formula

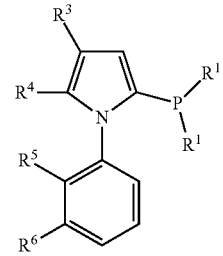

| Cpd. | $R^1$ | $R^5$ | $R^6$ | $R^3$ | $R^4$ |
|---|---|---|---|---|---|
| A-1 | H₃C—C(CH₃)(CH₃) | H | H | H | H |
| A-2 | cyclohexyl | H | H | H | H |
| A-3 | phenyl | H | H | H | H |
| A-4 | adamantyl | H | H | H | H |
| A-5 | cyclohexyl | —OCH₃ | H | H | H |
| A-6 | cyclohexyl | 1) | 1) | H | H |
| A-7 | H₃C—C(CH₃)(CH₃) | 1) | 1) | H | H |
| A-8 | phenyl | 1) | 1) | H | H |
| A-9 | adamantyl | 1) | 1) | H | H |
| A-10 | cyclohexyl | H | H | 2) | 2) |
| A-11 | H₃C—C(CH₃)(CH₃) | H | H | 2) | 2) |
| A-12 | phenyl | H | H | 2) | 2) |
| A-13 | adamantyl | H | H | 2) | 2) |

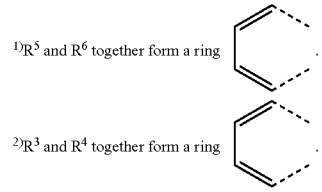

1) $R^5$ and $R^6$ together form a ring

2) $R^3$ and $R^4$ together form a ring

Examples of preferred catalysts include the following compounds:

palladium(II) acetylacetonate, palladium(0) dibenzylideneacetone complexes, palladium(II) propionate, $Pd_2(dba)_3$: [tris(dibenzylideneacetone)dipalladium(0)], $Pd(dba)_2$: [bis(dibenzylideneacetone)palladium(0)], $Pd(PR_3)_2$, wherein $PR_3$ is a trisubstituted phosphine of formula VI, $Pd(OAc)_2$: [palladium(II) acetate], palladium(II) chloride, palladium(II) bromide, lithium tetrachloropalladate(II), $PdCl_2(PR_3)_2$; wherein $PR_3$ is a trisubstituted phosphine of formula VI; palladium(0) diallyl ether complexes, palladium(II) nitrate, $PdCl_2(PhCN)_2$: [dichlorobis(benzonitrile)palladium(II)], $PdCl_2(CH_3CN)$: [dichlorobis(acetonitrile)palladium(II)], and $PdCl_2(COD)$: [dichloro(1,5-cyclooctadiene)palladium(II)].

Especially preferred are $PdCl_2$, $Pd_2(dba)_3$, $Pd(dba)_2$, $Pd(OAc)_2$, or $Pd(PR_3)_2$. Most preferred are $Pd_2(dba)_3$ and $Pd(OAc)_2$.

The palladium catalyst is present in the reaction mixture in catalytic amounts. The term "catalytic amount" refers to an amount that is clearly below one equivalent of the (hetero) aromatic compound(s), preferably 0.001 to 5 mol-%, most preferably 0.001 to 1 mol-%, based on the equivalents of the (hetero)aromatic compound(s) used.

The amount of phosphines or phosphonium salts in the reaction mixture is preferably from 0.001 to 10 mol-%, most preferably 0.01 to 5 mol-%, based on the equivalents of the (hetero)aromatic compound(s) used. The preferred ratio of Pd:phosphine is 1:4.

The base can be selected from all aqueous and nonaqueous bases and can be inorganic, or organic. It is preferable that at least 1.5 equivalents of said base per functional boron group is present in the reaction mixture. Suitable bases are, for example, alkali and alkaline earth metal hydroxides, carboxylates, carbonates, fluorides and phosphates such as sodium and potassium hydroxide, acetate, carbonate, fluoride and phosphate or also metal alcoholates. It is also possible to use a mixture of bases.

The reaction is typically conducted at about 0° C. to 180° C., preferably from 20 to 160° C., more preferably from 40 to 140° C. and most preferably from 40 to 120° C.

The solvent is for example selected from toluene, xylenes, anisole, THF, 2-methyltetrahydrofuran, dioxane, chlorobenzene, fluorobenzene or solvent mixtures comprising one or more solvents like e.g. THF/toluene and optionally water If the process described in PCT/EP2010/056776 is used, the base is preferably a lithium salt, such as, for example, lithium alkoxides (such as, for example, lithium methoxide and lithium ethoxide), lithium hydroxide, carboxylate, carbonate, fluoride and/or phosphate, most preferred aqueous LiOHxH$_2$O (monohydrate of LiOH) and (waterfree) LiOH).

The solvent is for example selected from toluene, xylenes, anisole, THF, 2-methyltetrahydrofuran, dioxane, chlorobenzene, fluorobenzene or solvent mixtures comprising one or more solvents like e.g. THF/toluene and optionally water. Most preferred is THF, or THF/water.

Preferably a polymerization reaction may take 5 hours of less.

In a preferred embodiment of the present invention the solvent is THF, the base is LiOH and the reaction is conducted at a temperature of about 65° C.

Advantageously, the polymerisation is carried out in presence of
a) palladium(II) acetate, or Pd$_2$(dba)$_3$, (tris(dibenzylideneacetone)dipalladium(0)) and an organic phosphine A-1 to A-13,
b) LiOH, or LiOHxH$_2$O and
c) THF, and optionally water. If the monohydrate of LiOH is used, no water needs to be added.

Most preferred the polymerisation is carried out in presence of
a) palladium(II) acetate, or Pd$_2$(dba)$_3$ (tris(dibenzylideneacetone)dipalladium(0)) and

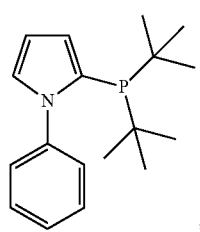

b) LiOHxH$_2$O; and
c) THF. The palladium catalyst is present in an amount of preferably about 0.5 mol-%, based on the equivalents of the (hetero)aromatic compound(s) used. The amount of phosphines or phosphonium salts in the reaction mixture is preferably about 2 mol-%, based on the equivalents of the (hetero)aromatic compound(s) used. The preferred ratio of Pd:phosphine is about 1:4.

In another preferred embodiment, the polymerisation is carried out in presence of
a) palladium(II) acetate, or Pd$_2$(dba)$_3$, (tris(dibenzylideneacetone)dipalladium(0)) and an organic phosphonium salt, especially (t-Bu)$_3$PHBF$_4$,
b) aqueous K$_3$PO$_4$,
c) THF, or THF/Toluol.]

Preferably the polymerization reaction is conducted under inert conditions in the absence of oxygen.

The process of the present invention is suitable for large-scale applications, is readily accessible and convert starting materials to the respective polymers in high yield, with high purity and high selectivity. The process can provide polymers having weight average molecular weights of at least 10,000 g/mol, more preferably at least 15,000 g/mol, most preferably at least 20,000 g/mol. The at present most preferred polymers have a weight average molecular weight of 20,000 to 80,000 g/mol. Molecular weights are determined according to high-temperature gel permeation chromatography (HT-GPC) using polystyrene standards. The polymers preferably have a polydispersity of 1.01 to 10, more preferably 1.1 to 3.0, most preferred 1.5 to 2.5.

If desired, a monofunctional halide, boronate, such as, for example, a monofunctional aryl halide, or aryl boronate, may be used as a chain-terminator in such reactions, which will result in the formation of a terminal aryl arouo:

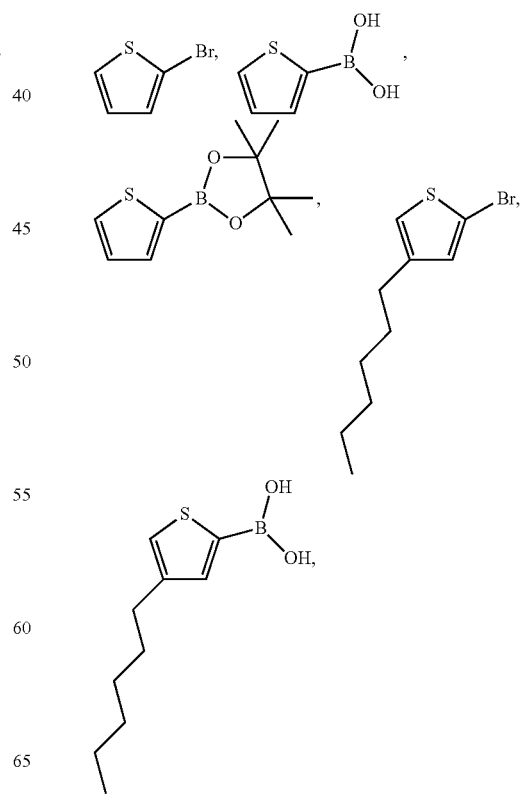

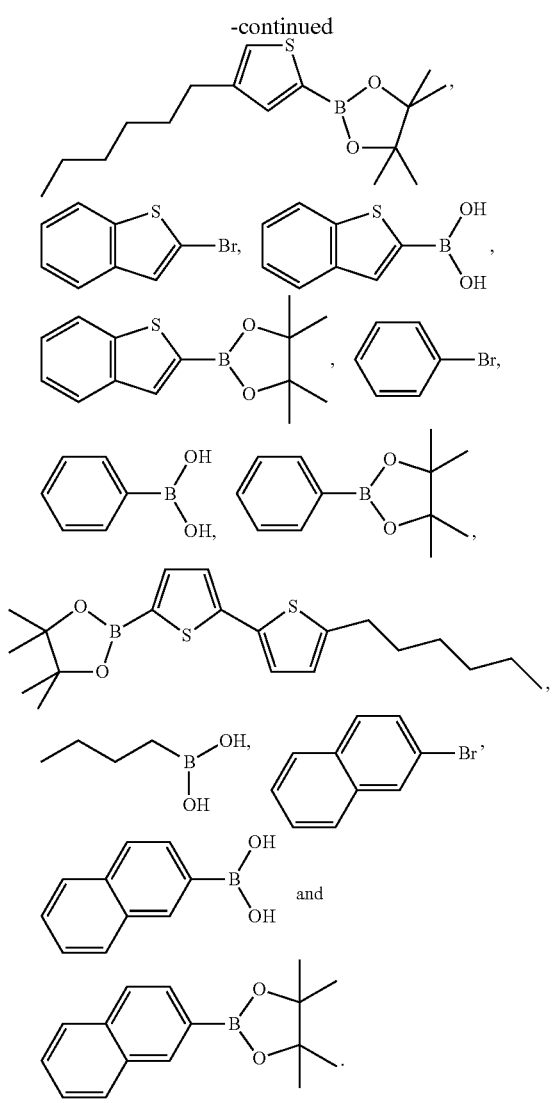

It is possible to control the sequencing of the monomeric units in the resulting copolymer by controlling the order and composition of monomer feeds in the Suzuki reaction.

The polymers of the present invention can also be synthesized by the Stille coupling (see, for example, Babudri et al, J. Mater. Chem., 2004, 14, 11-34; J. K. Stille, Angew. Chemie Int. Ed. Engl. 1986, 25, 508). To prepare polymers corresponding to formula II a dihalogenide of formula $X^{10}$-A-$X^{10}$ is reacted with an equimolar amount of an organo tin compound corresponding to formula

or a dihalogenide of formula

is reacted with an equimolar amount of an organo tin compound corresponding to formula $X^{11'}$-A-$X^{11'}$, wherein $X^{11}$ is independently in each occurrence —$SnR^{207}R^{208}R^{209}$, wherein $R^{207}$, $R^{208}$ and $R^{209}$ are identical or different and are H or $C_1$-$C_6$alkyl, or two of the groups $R^{207}$, $R^{208}$ and $R^{209}$ form a ring and these groups are optionally branched, in an inert solvent at a temperature in range from 0° C. to 200° C. in the presence of a palladium-containing catalyst. It must be ensured here that the totality of all monomers used has a highly balanced ratio of organotin functions to halogen functions. In addition, it may prove advantageous to remove any excess reactive groups at the end of the reaction by end-capping with monofunctional reagents. In order to carry out the process, the tin compounds and the halogen compounds are preferably mixed together in one or more inert organic solvents and pumped through the agitated reactor assembly at a temperature of from 0 to 200° C., preferably from 30 to 170° C. for a period of from 0.1 hour to 5 hours, preferably $t_{reaction}$<2 h, and more preferably $t_{reaction}$<1 h. The crude product can be purified by methods known to the person skilled in the art and appropriate for the respective polymer, for example repeated re-precipitation or even by dialysis.

Suitable organic solvents for the process described are, for example, ethers, for example diethyl ether, dimethoxyethane, diethylene glycol dimethyl ether, tetrahydrofuran, dioxane, dioxolane, diisopropyl ether and tert-butyl methyl ether, hydrocarbons, for example hexane, isohexane, heptane, cyclohexane, benzene, toluene and xylene, alcohols, for example methanol, ethanol, 1-propanol, 2-propanol, ethylene glycol, 1-butanol, 2-butanol and tert-butanol, ketones, for example acetone, ethyl methyl ketone and isobutyl methyl ketone, amides, for example dimethylformamide (DMF), dimethylacetamide and N-methylpyrrolidone, nitriles, for example acetonitrile, propionitrile and butyronitrile, and mixtures thereof.

The palladium and phosphine components should be selected analogously to the description for the Suzuki variant.

Alternatively, the polymers of the present invention can also be synthesized by the Negishi reaction using zinc reagents A-$(ZnX^{22})_2$, wherein $X^{22}$ is halogen and halides, and $COM^1$-$(X^{23})_2$, wherein $X^{23}$ is halogen or triflate, or using A-$(X^{23})_2$ and $COM^1$-$(ZnX^{22})_2$. Reference is, for example, made to E. Negishi et al., Heterocycles 18 (1982) 117-22.

Alternatively, the polymers of the present invention can also be synthesized by the Hiyama reaction using organosilicon reagents A-$(SiR^{210}R^{211}R^{212})_2$, wherein $R^{210}$, $R^{211}$ and $R^{212}$ are identical or different and are halogen, $C_1$-$C_6$alkyl and $COM^1$-$(X^{23})_2$, wherein $X^{23}$ is halogen or triflate, or using A-$(X_{23})_2$ and $COM^1$-$(SiR^{210}R^{211}R^{212})_2$. Reference is, for example, made to T. Hiyama et al., Pure Appl. Chem. 66 (1994) 1471-1478 and T. Hiyama et al., Synlett (1991) 845-853.

The process according to the invention can be used in connection with homogeneous as well as with heterogeneous reaction systems. Preferably, the process according to the invention concerns heterogeneous reaction systems. Heterogeneous reaction systems are characterized in that, that the reaction system comprises certain components which are not miscible or only partially miscible with the other components and/or show some tendency of phase separation.

Heterogeneous reaction systems can comprise a mixture of two or more substances which are none miscible with each other and which form a dispersion. Examples for heterogeneous systems are provided by liquid-liquid systems or solid-liquid systems (e.g. gels, emulsions, sols). The systems can be present in the form of a colloidal system or as heterogeneous mixture.

One of the advantages according to the invention is associated with the high efficacy of mixing of the reaction system.

The high mixing efficacy is especially favourable in the case of heterogeneous reaction systems.

The agitated reactor assembly comprises at least two or more reaction cells which are connected by connecting channels (or inter cell connecting channels) in such a way that the reaction cells form a serial array with respect to the direction of the fluid which flows through the reactor assembly. The function of the inter cell connecting channels is to avoid back mixing effects of fluid between cells. Preferably, the connecting channels have a smaller volume than the reaction cells and the connecting channels may be equipped with non-return valves.

The size of the individual reaction cells is determined by the kinetic behaviour of the coupling polymerization and the time consumed for equilibrating the tempera-ture whereby the process of the invention is based on a set-up which results in the production of polymers which have improved properties over similar materials which were obtained in batch experiments. Different type of coupling reaction will require differences in the reactor set-up. By using the preferred cell geometry the fluids which are transferred into the reactor can be heated up in a very well controlled manner.

A characteristic parameter is provided by the temperature equilibration time which is describes by the heating-up rate needed for the fluids reaching 95% of the temperature of the cell wall of a reaction cell. This temperature equilibration time of the reaction fluid is set into proportion to the mean residence time in the reaction cells of the agitated reactor. Despite of a short residence time of the re-action fluid in the agitated cell reactor over a batch reactor it is possible to reach a high value to the fraction of the residence time to heating-up time of the fluid.

The ratio of the residence time tres to the heating-up time th-up is larger than 5, preferably the ratio is larger than 10 and more preferable the ratio is larger than 20. The term heating-up time means the time which is needed to heat up the fluid up to 95% of the temperature of the wall of a reaction cell of the agitated cell reactor. The consequence is that the reaction cells are restricted in size and have a small volume which depends on the synthesis system and conditions.

The process of the invention is connected to a certain type of reaction cells and provides fast heating-up of the fluid system and high efficacy in mixing of the fluid system. The result is that polymeric coupling products can be obtained which exhibit improved properties with respect to the molecular weight and low degree in polydispersity. The use of the process for the production scale needs to consider that there are certain limitations with respect to the amount of polymers which can be produced with a single reaction block due to the fact that the dimensions of the reaction cells have an upper limit which depends on the reaction system.

The synthesis system of a certain group of polymeric coupling products which are obtained according to the invention are characterized by their viscosity. In a preferred embodiment the process of the invention is used for the synthesis of polymeric coupling products out of reactions systems with high viscosity.

In case of handling highly viscous synthesis systems in connection to the process of the invention the inter-cell connection channels have to fulfil certain require-ments. The diameter of the inter-cell conduits should be equal or higher than 1 mm, more preferably equal or higher than 2 mm, more preferred larger than 3 mm.

The volume of a reaction cell is large with respect to the volume of the inter-cell conduits. The ratio between the volume of the reaction cell and the volume of the inter-cell conduit greater than 5, more preferably greater than 10, even more pre-ferred are 20, 50 or 100. The present invention relates to the processing of an educt fluid in a reactor assembly which has a mean for causing agitation within the cells which does not require a mechanical connection of the agitation mechanism within the cell to a drive mechanism which is outside the cell.

In a preferred embodiment, the process is based on the use of an agitated assembly.

In a further preferred embodiment, the process comprises a physical shaking of the reactor assembly to promote mixing.

In another preferred embodiment, the process comprises the use of means which tether the agitator element within the cell or cells by a hinge or flexible connection.

In another preferred embodiment, the process of mixing is promoted by gas bubbles or gas pockets which are contained in the reactor assembly as it is shaken.

Preferably, the process comprises the use of different educt fluid materials having different densities which promote mixing as the reactor assembly is shaken.

Preferably, the process is based on the use of a magnetic coupling which provides the connection between an external drive mechanism and an agitator element within the cell.

Preferably, the process is performed in such manner that the cell capacities of the different cells of the reactor assembly are varied. By this it is possible to control the degree of conversion within each cell. For example, within a series of cells, each cell performs approximately the same amount of conversion. Alternatively, it can be assured that, within a series of cells, each cell performs approximately the same heat load (in most cases similar heat load will be comparable to degree of conversion).

More preferably, the process is performed in such way that the reaction temperature is controlled by a heat transfer element or by heat transfer elements.

Even more preferably, the process comprises that different heat transfers are obtained in different reaction cells by a variation of the heat transfer area.

In a preferred embodiment of the process the capacity of the cells are reduced to the desired volume by using inserts and preferably, the agitating elements are used as inserts. The agitator element may also be a porous plug of catalytic material such that the process fluid can pass through the porous material as the agitator element moves.

In a preferred embodiment, the reaction cells are created in a single block of material.

In a further preferred embodiment, the cells are provided with a cooling/heating system in the form of a jacket.

Preferably, the process according to the invention is carried out under heating and/or cooling whereby the cells are immersed in a heating or cooling bath.

Preferably, the process is based on the use of a reactor assembly which has its inter-cell conduits cut out on different sides of the block in such a way that the pulsing due to the movement of the agitation elements is reduced.

Preferably, the process is performed in such a way that it is ensured that the reaction fluid does not pass straight out of the cell without mixing properly by using a baffle.

Preferably, the process is performed in such a way that the volume of the inter-cell conduits is equal or greater than the volume of the reverse flow.

Preferably, the velocity of the educt fluid through the inter-cell conduit is equal or greater than the velocity of the reverse flow by diffusion.

In a preferred embodiment, the agitated reactor assembly is provided with a mounting arrangement in such a way that the rotation of the reactor assembly gives upward and downward flow in the forward direction.

Preferably, the agitated reactor assembly is equipped with four or more reaction cells, and more preferably with eight or more reaction cells. Further preferred is an embodiment of the reactor assembly which exhibits ten or more reaction cells.

Surprisingly, it is possible with the help of the process according to the invention to synthesize all those polymeric coupling products which are not easily accessible by other continuous methods. Furthermore, the polymeric coupling products which are prepared in accordance with the invention exhibit improved properties vis-a-vis the same products which are synthesized in a stirred batch reactor in a non-continuous manner.

The higher quality of the products and the improved properties of the polymeric coupling products associated herewith lead to a decrease of the effort as well as expenditure with processing and purification.

Therefore the process according to the invention is more energy efficient and better for the environment over processes which are known in the state of the art.

The individual reaction cells of the reactor assembly are equipped with agitators or agitation elements. At least one reaction cell of the multiplicity of reaction cells is equipped with an agitator, preferably two or more and further preferably four or more reaction cells are equipped with agitators.

The agitators or agitation elements are means for agitation which are used to promote the agitation. In a preferred embodiment the means for agitation are a solid material having a density which is different to the density of the reaction system. For example, the agitator elements can be rod shaped elements which are shaken up and down.

The size of the agitator elements can be varied to modify the volumetric capacity of the cell. The size variation of the agitator elements allows for a modification of the heat transfer area to process volume (or residence time of the process fluid). Each reaction cell may contain one or more agitator elements and the number of agitator elements may be varied for one individual reactor assembly from cell to cell.

Each reaction cell can have an inner volume which is in the range between 1 mL and 1000 mL, preferably the volume is in the range between 1 mL and 100 mL, and more preferably the volume is in the range between 1 mL and 10 mL. It is not excluded that the volume of a reaction cell is smaller than 1 mL. However, in the case that the reaction cells are smaller than 1 mL the reactor is less useful for the production of materials in the industrial scale of several kilograms or tons per year.

The agitators are preferably characterized in that they are free of any driver shaft or transmission drive. The agitators can be moved contactless, i.e. without a direct contact by means of mechanic drive. In a preferred embodiment the drive is based on a mechanical movement of the reactor assembly which is in functional relation with an excentric drive. This eliminates the need for shaft seals or glands (to prevent process material from leaking out).

Preferably the movement of the agitators is caused by the mechanical inertia of the reaction cell, whereby the reactor assembly is physically shaken with an external drive in order to cause mixing. In another preferred embodiment a magnetic coupling provides the connection between an external drive mechanism and an agitator element within the cell.

In another embodiment the cell capacities of the reaction cells are varied whereby the variation can be a favourable tool for the optimisation of the reaction conditions.

Preferably a heat transfer element is used for controlling the temperature of the reaction.

Depending on the design of the excentric drive the reactor can be excited to perform different movements.

In one embodiment the reactor assembly is moved in a linear direction. In another embodiment the movement is carried out in two different directions which are orthogonal to each other.

In case of an excitation of the reactor in different directions of a plane it is possible to define the phase relation with respect to the main axes. For the case that the phase difference of the exciting signals is 90° and the amplitude are of equal size then the movement of the reactor assembly will result in a circular movement.

For the case that the magnitude of the amplitude is not equal then an elliptical movement will be performed.

The use of a standard excentric drive will result in a movement where the reactor assembly describes a circular path. In case that the excentric drive allows it that the oscillation frequency and phase can be adjusted independently of each other, then it is possible to set up movements which are different from circular movements. For example the frequency ratio of 1 to 2 together with a phase shift of 90° results in a track which resembles the digit 8 (so called lissajous figure).

By using a preferred adjustment of the excentric drive and/or a certain configuration of the excentric drive and the agitator it is possible to optimise the efficacy of mixing in the reaction cells.

Preferably the amplitude of the movement of the reactor assembly is in a range from 0.1 mm to 20 mm and the oscillation frequency is in the range from 0.1 to 100 Hz. More preferably the amplitude of the movement is in the range from 1 mm to 10 mm and the oscillation frequency is in the range from 1 to 50 Hz.

The temperature of the reactor assembly is monitored and controlled during the course reaction. The reactor assembly is tempered at a temperature which is in the range from 0° C. to 180° C., preferably in the range from 20° C. to 160° C., particularly preferred in the range of 40° C. to 140° C. Most preferred is a temperature in the range from 40° C. to 120° C.

In a preferred embodiment the basic structure of the reactor assembly consists in a single block with individual compartments which form the reaction cells as it is shown in WO 2008/068019. The reaction cells can possess various shapes and can be formed angular, oval or round.

In a preferred embodiment the reaction cells have a cylindrical form with a round shape and flat ends. The design of the reactor and the form of the reaction cells depends on the dimensions of the reactor. The reaction cells of a lab-scale reactor which have an total inner volume of 100 mL do have the form of cylindrical slices. Such a reaction system can be used for small-scale production and gives excellent results concerning product quality.

In a preferred embodiment the actuation of the agitators is caused by impressing a mechanical force on the whole reactor assembly. The reactor assembly is in a functional connection with the actuating drive.

One considerable advantage in connection with the process according to the invention is that all those polymeric coupling products are accessible which show a low solubility and/or which are produced in reaction systems which show gelation.

In a preferred embodiment of the process according to the invention the process includes a step where an end-capping agent is given to the reaction system in order to effect a controlled reaction termination. The end-capping agent is a chemical species which reacts with the reactive groups of the polymers and inhibits that the chain growth reactions will proceed. The end-capping agent can be added to the exit line of the product fluid stream or it can be added to the reactor assembly in a region close to the exit line. The addition of the end-capping provides an additional measure to control the reaction and the molecular weight distribution of the product.

As a result of the low solubility the precipitation and deposition of polymer can take place within the reaction cells during the synthesis. The precipitation of the product can be associated with a high increase in the viscosity of the fluid stream.

In a further and preferred embodiment the process according to the invention can include a precipitation step at the end of the reaction in order to have a complete precipitation of the reaction product. The precipitation agent can be fed to the exit fluid line or to a storage tank.

The increase of the viscosity can also be caused by gelation or partial gelation of the reaction system. Based on the process according to the invention it is possible to produce polymers which have a molecular weight which is equal or higher than $10^4$ g/mol, preferably the molecular weight is equal or higher than $1.5*10^4$ g/mol, more preferably the molecular weight of the polymers is equal or higher than $2*10^4$ g/mol.

Beyond that the polymeric coupling products which are obtained in accordance to the invention show a molecular weight size distribution which is more narrow than the molecular weight size distribution of the polymers which have been synthesized in a stirred batch reactor. The degree of polydispersity is lower for the polymeric species which are synthesized by the process according to the invention over polymers which are synthesized by batch synthesis experiments.

A low degree of polydispersity is desired and favourable for the use of the materials in optical and electronic applications.

Due to the fact that it is possible by the process according to the invention to synthesize products which have the desired target properties extensive purification steps can be omitted which is a considerable advantage of the present invention.

An advantage with respect to the process according to the invention is its suitability for the production of polymers by coupling reactions in an industrial scale. Depending on the complexity and the requirements of the reaction system the reactor assembly can be restricted to certain dimensions.

One limiting factor is given by the efficacy of the mixing which is crucial for the process according to the invention. In case that the reaction cells exceed a certain dimension then an effective mixing is not possible anymore.

The educt fluids can be applied as homogeneous as well as heterogeneous phase mixture. The homogeneous mixtures are characterized in that no phase separation takes place while the system is free of an external entry of mechanical energy. The heterogeneous phase mixtures may show phase separation in case that the system is free of an entry of mechanical energy.

Particularly preferred is the use of the process according to the invention to produce polymeric coupling products which are applied in the field of printed electronics, organic semiconducters (e.g. OFET's, OLED's) and liquid crystal displays (e.g. LED's).

The process according to the invention is particularly suited for reaction systems where the monomer species show low or moderate solubility. Such reaction systems are subject to certain predefined limitations with respect to the monomer concentration which is employed for the reaction.

By using the process according to the invention it is possible to obtain polymeric coupling products which show a molecular weight distribution which is substantially more narrow than the molecular weight distribution obtained under similar conditions in a stirred batch reactor.

In order to use the process according to the invention in a technical production scale the increase in throughput is purposive. In a preferred embodiment a plurality of reactor assemblies are arranged in parallel. Preferably, the increase in throughput is obtained by the parallel arrangement of two or more reactor assemblies. It is for example conceivable that up to ten or up to one hundred or more reactor assemblies are operated in parallel.

The educt fluid is delivered to a plurality of entrance lines of different reactor assemblies. After the parallel streams of educt fluid have streamed through the cascade of the reaction cells of the individual reactor assemblies the product fluids out of all exit lines are combined.

Preferably the different cells of the reactor assemblies have the same shape whereby the number of reaction cells and the number of connecting channels between cells are identical for all reactor assemblies.

In a preferred embodiment the reactor assembly is in a vertical alignment during the performance of the synthesis whereby the fluid entrance is at the bottom side and the fluid exit is at the top side of the reactor assembly. The reaction fluid is pumped from the bottom to the top of the reactor assembly (in an up-stream flow). The vertical orientation in connection with the pumping direction from the bottom side to the top side is favoured because it prevents drainage of the reaction cells.

In a certain embodiment the holder of the reactor has means to rotate the reactor assembly in such a way that it can be turned by ninety or hundred eighty degree. The rotation of the reactor assembly by hundred eighty degrees allows for an operation under down-stream conditions.

An advantage of the process according to the invention is its suitability for an up-scaling which provides for its suitability for an industrial production process. The continuous method of operation allows for an online monitoring of the product quality by which makes it possible to exclude and reject the product material which does not have the expected target quality.

The continuous synthesis according to the process of the invention prevents the high production of waste material as it can occur in a batch reactor synthesis system.

An advantage in connection with the process according to the invention is its suitability for a scale-up which allows for its use in an industrial production scale. The reason for this is its continuous operation mode which permits an online control of the product quality. By the online control it is possible to detect that part of the product stream which does not fulfil the specification of the target material and which can be excluded then. The continuous synthesis process helps to prevent a high production of waste as it can occur by the synthesis in a stirred batch reactor. Based on high-priced starting material an excessive production of waste material is undesired.

Another advantage of the process according to the invention is that it can be integrated in an automatic work-flow which is controlled by a computer programmed process control.

The process according to the invention can be carried out with a set of reactor assemblies which are arranged in parallel. In a set of reactor assemblies the entrance lines of the reactors are in fluid communication with the educt tank(s) whereby the lines contain fluid lines and pumps. As a function of the specific reaction system the at least on auxiliary stream is supplied to the main stream of educt fluid. The auxiliary stream can contain the catalyst system which is needed for the coupling reaction.

In other embodiments it is possible that the educt fluid which is comprising the dissolved monomer is stored together with the catalyst in the same storage tank. In such a case the educt fluid and the catalyst are contacted and mixed together prior to pumping them to the reactor assembly.

In another embodiment at least part of the reactor block and/or cover of the reactor block are transparent for electromagnetic radiation of a defined wavelength. In this embodiment it is possible that the target reactions are initiated by the entry of external electromagnetic energy as for example by UV-energy.

In another embodiment the reaction cells are connected with light/radiation conductors which allow irradiating the inner part of the reaction cells with highly concentrated radiation. Such embodiment is favourable in case of a production scale due to the fact that irradiation with light/radiation conductors is very effective.

An advantage of the fully automatic execution of the procedure is provided by the online characterisation of the quality of product stream. The analytical means used for online monitoring consists of viscosimeter, gel-permeation chromatograph, spectrometer (e.g. IR, UV, UV-VIS, NMR, RAMAN or the like).

The online control of the product quality and the automatic process control allow to monitor and control the whole production process by an IPC (internal process control system). Consequently a focused optimization of the process parameters is possible whereby these process parameters are— among others—reaction temperature, residence time, frequency of agitation, concentration of monomer and/or catalyst concentration.

EXAMPLES

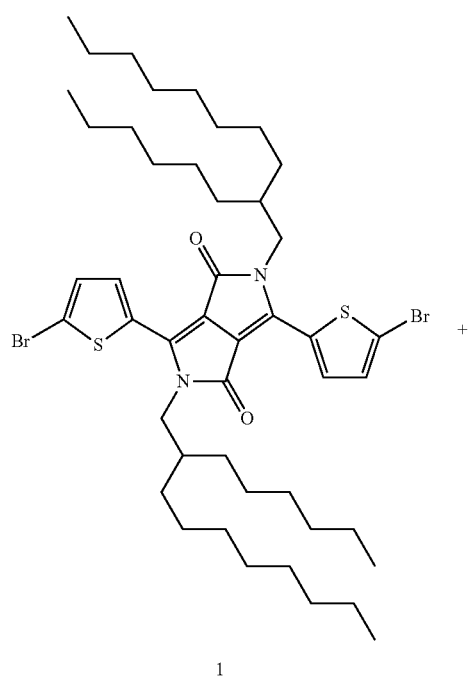

1

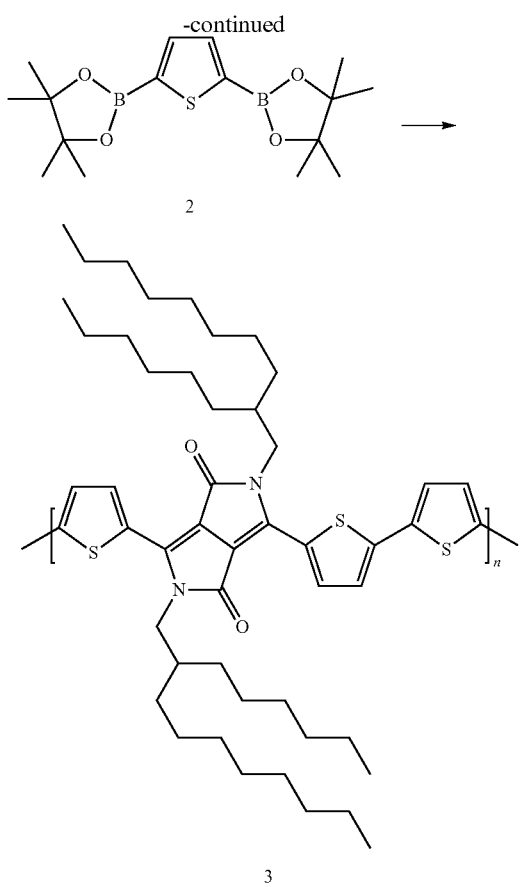

2

3

The process was exemplified for a Suzuki reaction of a diketo-pyrrolo-pyrrol (DPP) compound (given by 1,4-dioxo-2,5-di-n-decyl(2-hexyl)-3,6-bis(bromthiophen)pyrrolo[3,4-c]pyrrol) with a 2,5-di-boronic-acid-ester of thiophen. In case of example 1 (B1, B2) the coupling reaction was conducted in an agitated reactor assembly according to the invention with DPP and potassium phosphate. The agitated reaction assembly had ten reaction cells and each cell was equipped with an helically shaped agitator. Each reaction cell had a free volume of about 9 mL and the total free volume of the agitated reaction assembly was 90 mL.

As educt fluid, a degassed solution of 19.45 g of compound 1 (prepared according to example 2a of WO2008/000664), one equivalent (7.29 g) of compound 2, 0.3 g of tri-tert-butylphosphonium tetrafluoroborate ((t-Bu)3P*HBF4) and 0.49 g of tris(dibenzylideneacetone)dipalladium(0) ($Pd_2(dba)_3$) in 200 mL of tetrahydrofurane was prepared. As basic solution, a degassed solution of 13.56 g of potassium phosphate ($K_3PO_4$) was prepared.

The educt fluid stream and the basic solution were mixed in a mixing area in front of the reactor entrance and pumped into the reactor by using a flow rate of 2 mL/min for the educt fluid stream and 0.38 mL/min for the basic solution. The reactor assembly was moved by a mechanical excenter-drive with a frequency of 5 Hz and was heated at 60° C. The averare residence time of the reaction fluid in an individual reaction cell was in the range of 4.5 minutes.

For the comparative example the coupling reaction was performed in a stirred batch reactor with an inner volume of 250 mL. The batch reactor was heated for 1 h at a temperature of 60° C. and the reaction system was stirred by a teflon coated stirring bar by an external electromagnetic drive using a speed of 600 turns/minute.

The concentrations of monomer and catalyst in the batch experiment were identical to the concentrations which were used for the continuous experiment with the agitated reactor assembly.

The products were characterized by GPC analyses in order to determine the molecular weight and molecular weight distribution of each product. The analytical characterization of each product was performed two times and the results of the measurements are depicted in Table 1.

The product which was prepared by the process according to the invention had a molecular weight which was twice as high in comparison to the product obtained in the batch experiment. Furthermore, the polydispersity of the samples B1 and B2 was lower over the polydispersity of the samples (VB1, VB2) obtained in the batch experiment.

TABLE 1

|  | $M_w$ [g/mol] | $M_n$ [g/mol] | $M_w/M_n$ |
| --- | --- | --- | --- |
| B1 | 24300 | 13300 | 1.3 |
| B2 | 24400 | 13200 | 1.5 |
| VB1 | 11400 | 4900 | 2.5 |
| VB2 | 11400 | 4900 | 2.4 |

The GPC measurements were performed with the following apparatus: GPC PL 220 from Polymer laboratories (Church Stretton, UK; now Varian) and by using a detector which was based on refractive index determination. The column was a 3 "PLgel Olexis" column from Polymer laboratories which contained polymer particles having an average particle size of 13 µm (the column dimensions were 300x8 mm I.D.). The mobile phase consisted of 1,2,4-trichlorobenzene which had been purified by vacuum distillation and stabilised by butyl hydroxyl toluene. The chromatographic experiment was performed at 150° C. and the flow rate of the mobile phase was 1 ml/min. The injection volume was 200 µl whereby the solute concentration was 1 mg/ml.

The molecular weight determination was based on a calibration which had been performed with a set of 10 different polystyrene calibration standards obtained from Polymer Laboratories (Church Stretton, UK) spanning the molecular weight range from 1930000 g/mol-5000 g/mol. The calculation of the molecular weight was based on a polynomic calibration. The calibration standards had the average molecular weight of 1930000 g/mol, 1460000 g/mol, 1075000 g/mol, 560000 g/mol, 330000 g/mol, 96000 g/mol, 52000 g/mol, 30300 g/mol, 10100 g/mol and 5500 g/mol.

Figure 1:
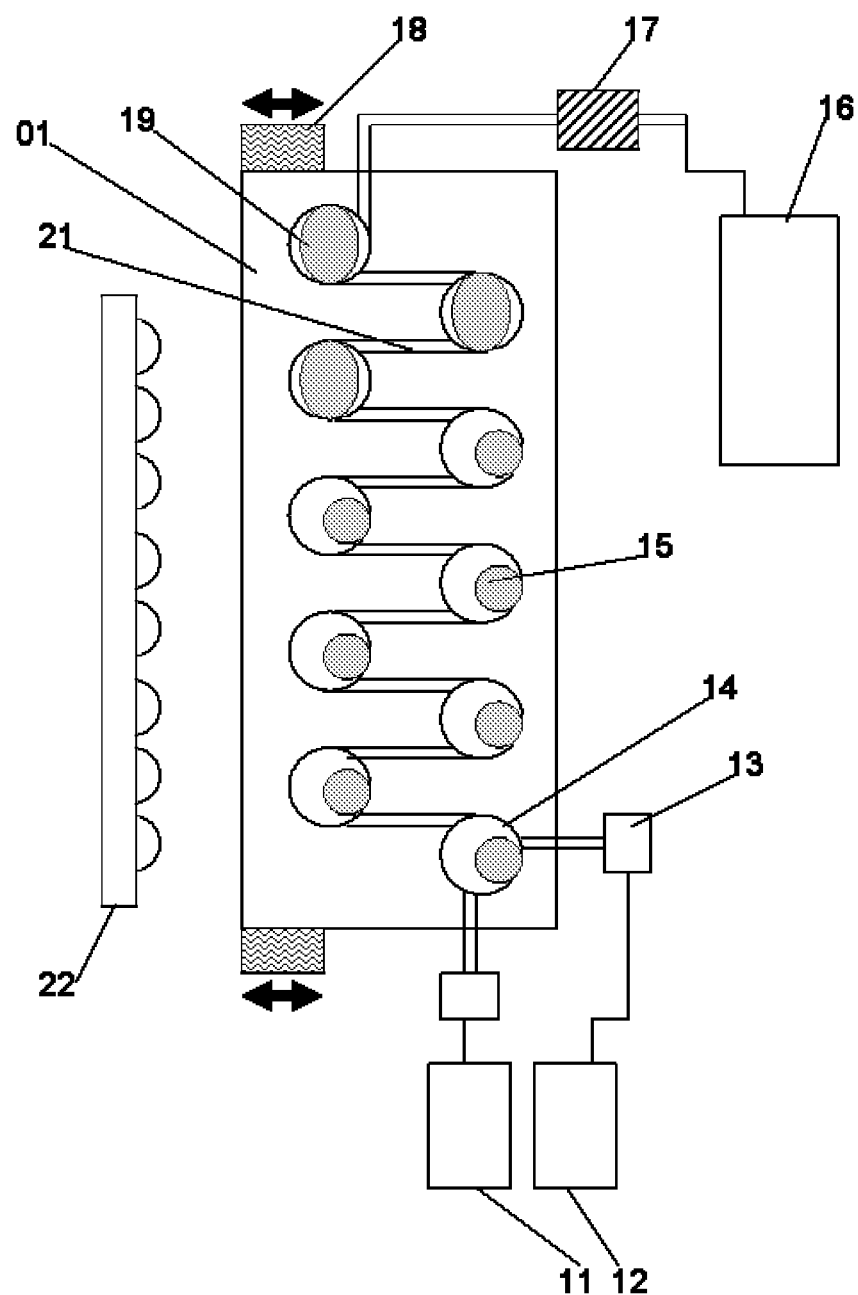
FIG. 1 shows a schematic presentation of an apparatus for the continuous conductance of coupling reactions in a reactor assembly which is equipped with ten reaction cells. The apparatus has two separate fluid lines for the addition of educt fluids as well as an analytical mean for the online characterization.
Figure 2:
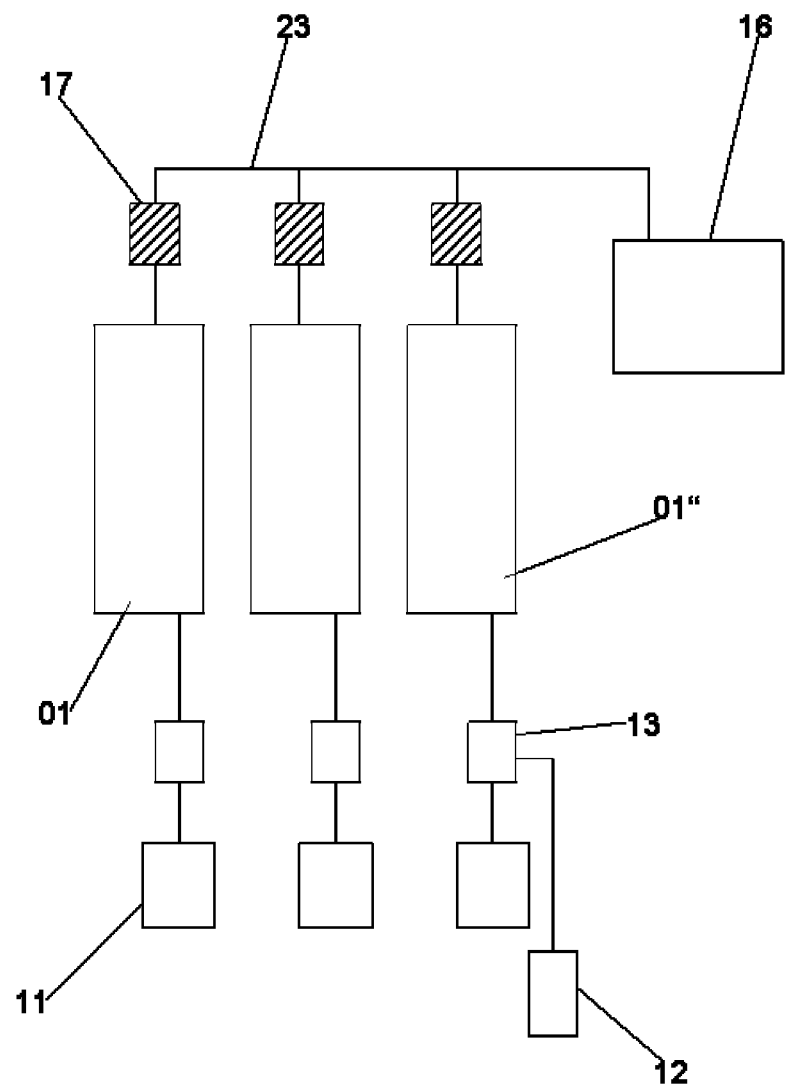
FIG. 2 shows a schematic presentation of an apparatus which is used for the production of polymeric coupling products. The apparatus is equipped with three reactor assemblies which are arranged in parallel.

List of References for the Drawings:
11 reservoir tank for educt fluid
12 reservoir tank for catalyst solution or base solution
13 pump
14 reaction cells
15 mixing element
16 collecting tank for product fluid
17 means for analytical characterization
18 excenter drive
19 filling elements
21 connection channel between reaction cell
22 radiation source
23 exit line
01, 01', 01" reactor assemblies

The invention claimed is:

1. A process for producing a polymeric coupling product in an agitated reactor assembly comprising at least two reaction cells with means for agitation, the process comprising:
   contacting an educt fluid comprising monomer species in a solvent with a catalyst, a suspended catalyst, or both in a mixing area so that the contacting is performed in an entrance area of the agitated reactor assembly or prior to delivering the educt fluid to the agitated reactor assembly;
   conveying a mixture of the educt fluid and catalyst solution through cells of the agitated reactor assembly to generate the polymeric coupling product
   wherein said means for agitation comprises an agitating mechanism within a reaction cell and a drive mechanism which is outside the reaction cell wherein said agitating mechanism is moved contactlessly; and
   discharging the polymeric coupling product out of an exit line of the agitated reactor assembly.

2. The process according to claim 1, wherein the agitated reactor assembly is equipped with four or more reaction cells.

3. The process according to claim 1, wherein the agitated reactor assembly and the educt fluid which is pumped through the agitated reactor assembly is tempered at a temperature of from 0° C. to 180° C.

4. The process according to claim 1, wherein fluids in different reaction cells are mixed with agitators.

5. The process according to claim 1, wherein a volume of an individual reaction cell of the agitated reactor assembly is from 0.5 mL to 100 mL.

6. The process according to claim 1, wherein an emanating product fluid is subject to an online characterization within specified time intervals.

7. The process according to claim 1, wherein at least part of formed polymeric coupling product is precipitated during reaction and/or
   a viscosity of a product fluid increases to a value of from 0.01 to 50 Pa*s wherein the viscosity is determined at 25° C. and under a shear-rate of from 0.3 to 50 $s^{-1}$.

8. The process according to claim 1, wherein a reaction is performed in two or more reactor assemblies which are arranged in parallel.

9. The process according to claim 1, wherein the process is performed in a fully automatic manner by a suitable process control.

10. The process according to claim 1, wherein the polymeric coupling product has a molecular weight equal or higher than $10^4$ g/mol.

11. The process according to claim 1, wherein the monomer species comprises a (hetero)aromatic compound which reacts under formation of aryl-aryl C—C couplings, wherein the (hetero)aromatic compound has at least one functional halide group and at least one functional boron group, or
   the monomer species comprises a copolymerized at least one first (hetero)aromatic compound and at least one second (hetero)aromatic compound under formation of aryl-aryl C—C couplings, wherein the first (hetero)aromatic compound has at least two functional halide groups and the second (hetero)aromatic compound has at least two functional boron groups, and wherein the educt fluid comprises
a) a catalyst/ligand system comprising a palladium catalyst and an organic phosphine or phosphonium compound and
b) a base or the educt fluid is contacted and mixed with a fluid comprising a) and b).

12. The process according to claim 1, wherein the polymeric coupling product has a polydispersity index.

13. The process according claim 1, wherein reactor cell of the agitated reactor assembly is exposed to radiation energy during reaction.

14. The process according to claim 2, wherein the agitated reactor assembly is equipped with eight or more reaction cells.

15. The process according to claim 3, wherein the agitated reactor assembly and the educt fluid which is pumped through the agitated reactor assembly is tempered at a temperature of from 40° C. to 120° C.

16. The process according to claim 4, wherein each of the agitators is shifted with an external excenter drive at an excitation amplitude of from 0.5 mm to 40 mm and oscillation frequency of from 0.1 Hz to 500 Hz.

17. The process according to claim 5, wherein the volume of the individual reaction cell is from 1 mL to 50 mL.

18. The process according to claim 7, wherein the viscosity increases to a value of from 0.2 to 10 Pa*s and
the viscosity is determined at 25° C. and under a shear-rate of from 0.3 to 50 $s^{-1}$.

19. The process according to claim 10, wherein the polymeric coupling product has a molecular weight equal or higher than $2*10^4$ g/mol.

* * * * *